US009692335B2

United States Patent
Suzuki

(10) Patent No.: US 9,692,335 B2
(45) Date of Patent: Jun. 27, 2017

(54) MOTOR DRIVING APPARATUS, MOTOR CONTROL APPARATUS, CONVEYANCE APPARATUS AND MOTOR DRIVING METHOD

(71) Applicant: Haruyuki Suzuki, Kanagawa (JP)

(72) Inventor: Haruyuki Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/245,364

(22) Filed: Aug. 24, 2016

(65) Prior Publication Data

US 2017/0063264 A1    Mar. 2, 2017

(30) Foreign Application Priority Data

Aug. 28, 2015   (JP) ................... 2015-169527

(51) Int. Cl.
    *H02P 8/00*          (2006.01)
    *H02P 8/12*          (2006.01)
    (Continued)

(52) U.S. Cl.
    CPC .............. *H02P 8/12* (2013.01); *B65H 29/12* (2013.01); *H02P 8/34* (2013.01); *B65H 2403/92* (2013.01)

(58) Field of Classification Search
    CPC ......... B65H 2511/514; B65H 2220/01; B60W 30/143; H02P 6/30; H02P 27/08; H02P 27/085
    (Continued)

(56) References Cited

U.S. PATENT DOCUMENTS

| 4,215,378 A | * | 7/1980 | Sato ........................ G11B 15/02 |
| | | | 360/74.1 |
| 4,963,808 A | * | 10/1990 | Torisawa ............... H02K 29/08 |
| | | | 318/254.2 |

(Continued)

FOREIGN PATENT DOCUMENTS

| JP | 2004-215385 | 7/2004 |
| JP | 2012-157122 | 8/2012 |
| JP | 2016-046859 | 4/2016 |

OTHER PUBLICATIONS

Takaharu Takeshita et al., "Sensorless Brushless DC Motor Drives Using Current Estimation Error", T.IEE Japan, vol. 115-D, No. 4, 1995, pp. 420-427.

(Continued)

*Primary Examiner* — Bentsu Ro
*Assistant Examiner* — Thai Dinh
(74) *Attorney, Agent, or Firm* — Harness, Dickey & Pierce, P.L.C.

(57) ABSTRACT

A motor driving apparatus for causing drive current to flow in first and second armature coils of two-phases to rotate a rotator, includes a drive unit configured to give first and second PWM pulse signals to ends of the first and second armature coils. The drive unit includes a first shift unit configured to, when a difference between pulse widths of the first PWM pulse signals given to the ends of the first armature coil is less than or equal to a first predetermined value, shift forward any one of pulses of the first PWM pulse signals, and a second shift unit configured to, when a difference between pulse widths of the second PWM pulse signals given to the ends of the second armature coil is less than or equal to a second predetermined value, shift backward any one of pulses of the second PWM pulse signals.

7 Claims, 17 Drawing Sheets

(51) Int. Cl.
*H02P 8/34* (2006.01)
*B65H 29/12* (2006.01)

(58) Field of Classification Search
USPC .............................. 318/696, 599, 288, 503
See application file for complete search history.

(56) References Cited

U.S. PATENT DOCUMENTS

| | | | |
|---|---|---|---|
| 5,729,067 A * | 3/1998 | Janutka | G05B 19/351 |
| | | | 310/12.04 |
| 6,118,235 A * | 9/2000 | Redlich | H02P 25/032 |
| | | | 310/12.24 |
| 6,838,853 B2 | 1/2005 | Matsunaga et al. | |
| 8,427,089 B2 | 4/2013 | Suzuki | |
| 8,860,346 B2 | 10/2014 | Shimizu et al. | |
| 8,866,421 B2 | 10/2014 | Kamatani et al. | |
| 8,872,453 B2 | 10/2014 | Kamatani et al. | |
| 9,018,885 B2 | 4/2015 | Suzuki et al. | |
| 9,024,568 B2 | 5/2015 | Suzuki | |
| 9,306,483 B2 | 4/2016 | Suzuki | |
| 2012/0074888 A1 | 3/2012 | Maekawa | |
| 2013/0307460 A1 | 11/2013 | Tsuchihashi et al. | |
| 2014/0258580 A1 | 9/2014 | Suzuki | |
| 2015/0185736 A1 | 7/2015 | Suzuki et al. | |
| 2016/0056743 A1 | 2/2016 | Suzuki et al. | |
| 2016/0065109 A1 | 3/2016 | Yamamoto et al. | |
| 2016/0149443 A1 | 5/2016 | Hashimoto et al. | |

OTHER PUBLICATIONS

Stmicroelectronics: "Order code Package Packing E-L6258EX PowerS036 Tube E-L6258EXTR PowerS036 Tape & Reel Contents," Dec. 1, 2007.
Extended European Search Report dated Feb. 16, 2017.

* cited by examiner

FIG.4

231
```
if(va>=vam){
  v1=va;
  v2=vam;
  cpm=0;
}
else{
  v1=vam;
  v2=va;
  cpm=1;
}
```

241
```
if(vb>=vbm){
  v1=vb;
  v2=vbm;
  cpm=0;
}
else{
  v1=vbm;
  v2=vb;
  cpm=1;
}
```

```
                                    ╱232
┌─────────────────────────┐
│ dT=v1-v2;               │
│ if(dT<2*d1){      ⎫     │
│   ts=-dT/2+d1;    ⎬ 61  │
│ }                 ⎭     │
│ else{                   │
│   ts=0;                 │
│ }                       │
└─────────────────────────┘
```

FIG.7

```
                        ╱233
┌──────────────┐
│ if(ud==1){   │
│   mv1=v1+ts; │
│ }            │
│ else{        │
│   mv1=v1-ts; │
│ }            │
└──────────────┘

╱243
┌──────────────┐
│ if(ud==1){   │
│   mv2=v2-ts; │
│ }            │
│ else{        │
│   mv2=v2+ts; │
│ }            │
└──────────────┘
```

FIG.8

```
                        ╱230
┌─────────────────┐
│ p1=(mv1>car);   │─71
│ p2=( v2 >car);  │─72
└─────────────────┘

╱240
┌─────────────────┐
│ p1=( v1 >car);  │
│ p2=(mv2>car);   │
└─────────────────┘
```

FIG.9

236
```
if(cpm==0){
  ap =p1;
  am=p2;
}
else{
  ap =p2;
  am=p1;
}
```

246
```
if(cpm==0){
  bp =p1;
  bm=p2;
}
else{
  bp =p2;
  bm=p1;
}
```

MOTOR DRIVING APPARATUS, MOTOR CONTROL APPARATUS, CONVEYANCE APPARATUS AND MOTOR DRIVING METHOD

CROSS-REFERENCE TO RELATED APPLICATIONS

The present application claims benefit of priority under 35 U.S.C. §119 of Japanese Patent Application No. 2015-169527, filed Aug. 28, 2015. The contents of this application are incorporated herein by reference in their entirety.

BACKGROUND OF THE INVENTION

1. Field of the Invention

The disclosures herein generally relate to a motor driving apparatus, a motor control apparatus, a conveyance apparatus and a motor driving method.

2. Description of the Related Art

Conventionally, stepping motors, in which drive currents, phases of which are different from each other by 90 degrees, are applied to two pairs (two phases) of armature coils, and by advancing subsequently the electric current phases, electromagnetic torque is generated in a magnetized rotator, which rotates, have been known.

Moreover, in a drive circuit of the conventional stepping motor, detecting a drive current supplied to the armature coil by providing an H-bridge circuit corresponding to each armature coil, and proving an electric current detection resistor on a lower common ground side of the H-bridge circuit, is known (Japanese Published Patent Application No. 2012-157122).

SUMMARY OF THE INVENTION

It is a general object of at least one embodiment of the present invention to provide a motor driving apparatus, a motor control apparatus, a conveyance apparatus and a motor driving method that substantially obviates one or more problems caused by the limitations and disadvantages of the related art.

In one embodiment, a motor driving apparatus causes drive current to flow in first and second armature coils of two-phases, wound so as not to be coupled to each other, to rotate a rotator. The motor driving apparatus includes a drive unit configured to give a first PWM pulse signal to each of both ends of the first armature coil, and give a second PWM pulse signal to each of both ends of the second armature coil, to cause the drive current to flow in the first and second armature coils. The drive unit includes a first shift unit configured to, when a difference between pulse widths of the first PWM pulse signal given to one end of the first armature coil and of the first PWM pulse signal given to the other end is less than or equal to a first predetermined value, shift forward any one of pulses of the first PWM pulse signals given to the one end and the other end of the first armature coil; and a second shift unit configured to, in a case where the shift by the first shift unit is performed, when a difference between pulse widths of the second PWM pulse signal given to one end of the second armature coil and of the second PWM pulse signal given to the other end is less than or equal to a second predetermined value, shift backward any one of pulses of the second PWM pulse signals given to the one end and the other end of the second armature coil, along with the first shift unit.

BRIEF DESCRIPTION OF THE DRAWINGS

Other objects and further features of embodiments will become apparent from the following detailed description when read in conjunction with the accompanying drawings, in which:

FIG. 4 is a diagram depicting an example of description when an operation of a sorting unit is described by a program;

FIG. 7 is a diagram depicting a description example when an operation of an addition and subtraction unit is described by a program;

FIG. 8 is a diagram depicting a description example when an operation of a PWM shift unit is described by a program;

FIG. 9 is a diagram depicting a description example when an operation of a sorting restoration unit is described by a program;

DESCRIPTION OF THE PREFERRED EMBODIMENTS

In the following, embodiments of the present invention will be described with reference to the accompanying drawings.

First Embodiment

Figure 1:
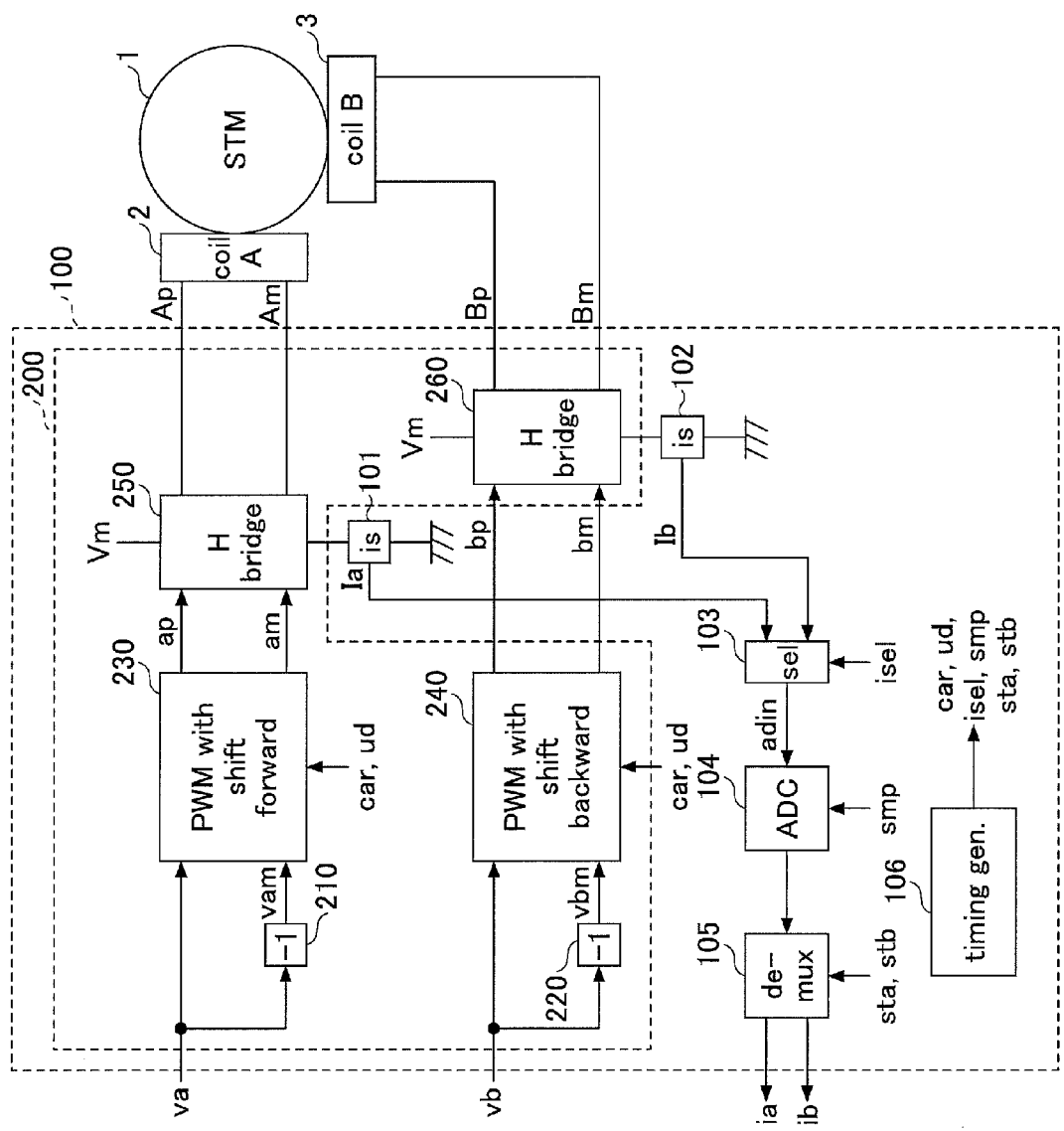
FIG. 1 is a diagram for explaining a motor control apparatus according to a first embodiment.

In the following, the first embodiment will be described with reference to drawings. FIG. 1 is a diagram for explaining a motor control apparatus according to the first embodiment;

In a stepping motor 1 according to the first embodiment, by applying alternating currents, phases of which are different from each other by about 90 degrees, to an excitation coil A phase of two phases (in the following, A phase coil) 2 and an excitation coil B phase (in the following, B phase coil) 3, a rotator (rotor) including a permanent magnet rotates.

A motor control apparatus 100 according to the first embodiment supplies alternating current (drive current) to the A phase coil 2 and the B-phase coil 3.

The motor control apparatus 100 according to the embodiment includes a motor driving device 200, electric current detection units 101, 102, a selector 103, an A/D converter 104, a demultiplexer 105 and a timing generation unit 106.

At first, the motor driving device 200 will be described. The motor driving device 200 according to the first embodiment includes sign reversion units 210, 220, PWM shift units 230, 240, and H-bridge units 250, 260.

In the motor driving device 200 according to the embodiment, the sign reversion units 210, 220 and the PWM shift units 230, 240 form a motor driving means, and the H-bridge units 250, 260 form an electric current detection means.

The motor driving device 200 according to the embodiment outputs PWM (Pulse Width Modulation) pulse signals Ap, Am depending on an electric voltage equivalent value (electric voltage command value) va applied to the A-phase coil 2 to coil terminals of the A-phase coil 2. Moreover, the motor driving device 200 according to the embodiment outputs PWM pulse signals Bp, Bm depending on an electric voltage equivalent value vb applied to the B-phase coil 3 to coil terminals of the B-phase coil 3.

Moreover, the motor driving device 200 according to the embodiment detects a coil current equivalent value is flowing in the A-phase coil 2 and a coil current equivalent value ib flowing in the B-phase coil 3.

In the following, the respective members included in the motor driving device 200 will be described. The sign reversion unit 210 according to the embodiment outputs a value vam that is obtained by reverting the electric voltage equivalent value va of the A-phase coil 2 (in the following, reversion electric voltage equivalent value vam). That is, vam=−va. The electric voltage equivalent value va is assumed to take positive and negative values around 0.

The sign reversion unit 220 has the same configuration as the reversion unit 210, and outputs an equivalent value vbm which is obtained by reverting an electric voltage equivalent value vb to the B-phase coil 3 (in the following, reversion electric voltage equivalent value vbm). That is, vbm=−vb. The electric voltage equivalent value vb is assumed to take positive and negative values around 0.

The PWM shift unit 230 converts the electric voltage equivalent value va and the reversion electric voltage equivalent value vam into a pulse signal ap and a pulse signal am, which have duties proportional to the respective values.

The PWM shift unit 230 according to the embodiment sets the duties of the pulse signals ap, am to 50% when the electric voltage equivalent value va and the reversion electric voltage equivalent value vam are zero, gives pulse signal between 50% and 100% for positive value, and gives pulse signal between 50% and 0% for negative value.

Moreover, the PWM shift unit 230 of the embodiment, when a difference between pulse widths of the pulse signals ap, am is a predetermined value or less, moves (shifts) temporally the pulse signal ap forward while maintaining the duty.

A signal car supplied to the PWM shift unit 230 is a carrier signal for performing the PWM conversion. In the embodiment, the carrier signal car is assumed to be a triangular wave which is positive/negative symmetric. Similarly, a signal ud supplied to the PWM shift unit 230 is a signal indicating whether the carrier signal car is an ascending section or a descending section. The signal ud is used for shifting temporally the pulse signal ap while maintaining the duty.

The PWM shift unit 240 has the same configuration as the PWM shift unit 230, and converts the electric voltage equivalent value vb and the reversion electric voltage equivalent value vbm into a pulse signal by and a pulse signal bm, which have duties proportional to the respective values.

The PWM shift unit 240 sets the duties of the pulse signals bp, bm to 50% when the electric voltage equivalent value vb and the reversion electric voltage equivalent value vbm are zero, gives pulse signal between 50% and 100% for positive value, and gives pulse signal between 50% and 0% for negative value.

Moreover, the PWM shift unit 240 of the embodiment, when a difference between pulse widths of the pulse signals bp, bm is a predetermined value or less, moves (shifts) temporally the pulse signal bm backward while maintaining the duty.

A signal car supplied to the PWM shift unit 240 is a carrier signal for performing the PWM conversion. In the embodiment, the carrier signal car is assumed to be a triangular wave which is positive/negative symmetric. Similarly, a signal ud supplied to the PWM shift unit 240 is a signal indicating whether the carrier signal car is an ascending section or a descending section. The signal ud is used for shifting temporally the pulse signal bm while maintaining the duty.

Here, the pulse signal ap is assumed to be shifted forward and the pulse signal bm is assumed to be shifted backward, but not limited to. The PWM shift unit 230 may shift the pulse signal am backward. In this case, the PWM shift unit 240 only has to shift the pulse signal by forward.

Configuration and operation of the PWM shift units 230, 240 will be described later in detail.

The H-bridge unit 250 converts the pulse signals ap, am into PWM pulse signals Ap, Am applied to coil terminals of the A-phase coil 2.

The H-bridge unit 260 has the same configuration as the H-bridge unit 250, and converts the pulse signals bp, bm into PWM pulse signals Bp, Bm applied to coil terminals of the B-phase coil 3. The H-bridge units 250, 260 will be described in detail later.

Next, the respective members other than the motor driving device 200 included in the motor control apparatus 100 according to the embodiment will be described.

The electric current detection unit 101 according to the embodiment is inserted between a ground side common bus of the H-bridge unit 250 and ground, and outputs a coil electric current Ia flowing in the A-phase coil 2.

The electric current detection unit 102 according to the embodiment is inserted between a ground side common bus of the H-bridge unit 260 and ground, and outputs a coil electric current Ib flowing in the B-phase coil 3. The electric current detection units 101, 102 are enabled, for example, by a resistor or the like.

The selector 103 according to the embodiment selects, when a value of a selection instruction signal isel is 0 (low level: L level), the coil electric current Ia detected from the A-phase coil 2 and outputs as an adin signal. Moreover, the selector 103 according to the embodiment selects, when a value of a selection instruction signal isel is 1 (high level: H level), the coil electric current Ib detected from the B-phase coil 3 and outputs as an adin signal.

The A/D converter 104 according to the embodiment converts the adin signal to a digital value by a sampling trigger signal smp.

The demultiplexer 105 (latching means) according to the embodiment latches an output of the A/D converter 104 by an A-phase electric current latch signal sta and outputs a coil electric current equivalent value ia. Moreover, the demultiplexer 105 (latching means) according to the embodiment latches an output of the A/D converter 104 by a B-phase electric current latch signal stb and outputs a coil electric current equivalent value ia.

That is, the coil electric current equivalent value ia is a value that is obtained by converting the coil electric current Ia, which is an analog signal detected by the electric current detection unit 101, into a digital signal by the A/D converter 104. Moreover, the coil electric current equivalent value ib is a value that is obtained by converting the coil electric current Ib, which is an analog signal detected by the electric current detection unit 102, into a digital signal by the A/D converter 104.

The timing generation unit 106 according to the embodiment causes the carrier signal car, the signal ud, the selection instruction signal isel, the sampling trigger signal smp, the A-phase electric current latch signal sta, and the B-phase electric current latch signal to occur. The timing generation unit 106 according to the embodiment is enabled by a publicly known technique.

The carrier signal car is a triangular wave having predetermined amplitudes positively/negatively around 0 at a constant period. The signal ud is assumed to be a signal which is 0 (L level) when a value of the carrier signal car increases, and is 1 (H level) when the value of the carrier signal car decreases.

The selection instruction signal isel is assumed to be a signal which is 0 (L level) when the value of the carrier signal car is positive, and is 1 (H level) when the value of the carrier signal car is negative.

The sampling trigger signal smp is assumed to be a signal generated when the carrier signal car is decreasing and a value thereof is a positive predetermined value for the first time, and generated when the carrier signal car is decreasing and a value thereof is a negative predetermined value for the second time.

The A-phase electric current latch signal sta is assumed to be a signal generated in synchronization with the sampling trigger signal smp for the first time. The B-phase electric current latch signal stb is assumed to be a signal generated in synchronization with the sampling trigger signal smp for the second time.

Figure 2:
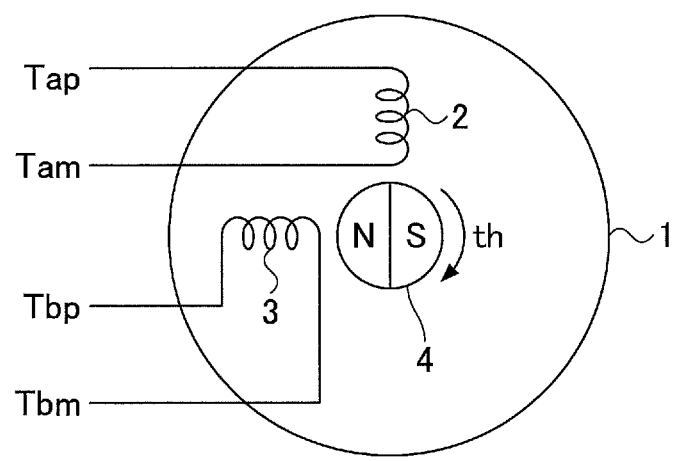
FIG. 2 is a diagram depicting an example of a stepping motor according to the first embodiment.

Next, with reference to FIG. 2, a stepping motor 1 according to the embodiment will be described. FIG. 2 is a diagram depicting an example of a stepping motor according to the first embodiment.

In the stepping motor 1 according to the embodiment, the A-phase coil 2 and the B-phase coil 3 are not coupled to each other and are independent from each other. The A-phase coil 2 includes coil terminals Tap, Tam, and the B-phase coil 3 includes coil terminals Tbp, Tbm. Moreover, the stepping motor 1 includes a rotor 4. In the rotor 4 permanent magnets are arranged on a circle, or the rotor 4 is magnetized.

The A-phase coil 2 and the B-phase coil 3 are arranged in a relation of 90 degrees with respect to a direction of a magnetic flux that the permanent magnets generate, and the rotor 4 rotates by applying alternating currents, phases of which are shifted from each other by 90 degrees, to the A-phase coil 2 and the B-phase coil 3. In the embodiment, although one of the two coils is referred to as the A-phase coil 2 and the other is the B-phase coil 3, the A-phase coil and the B-phase coil may be defined inversely. That is, any of the two coils may be the A-phase coil. In this case the other only has to be the B-phase coil.

Figure 3:
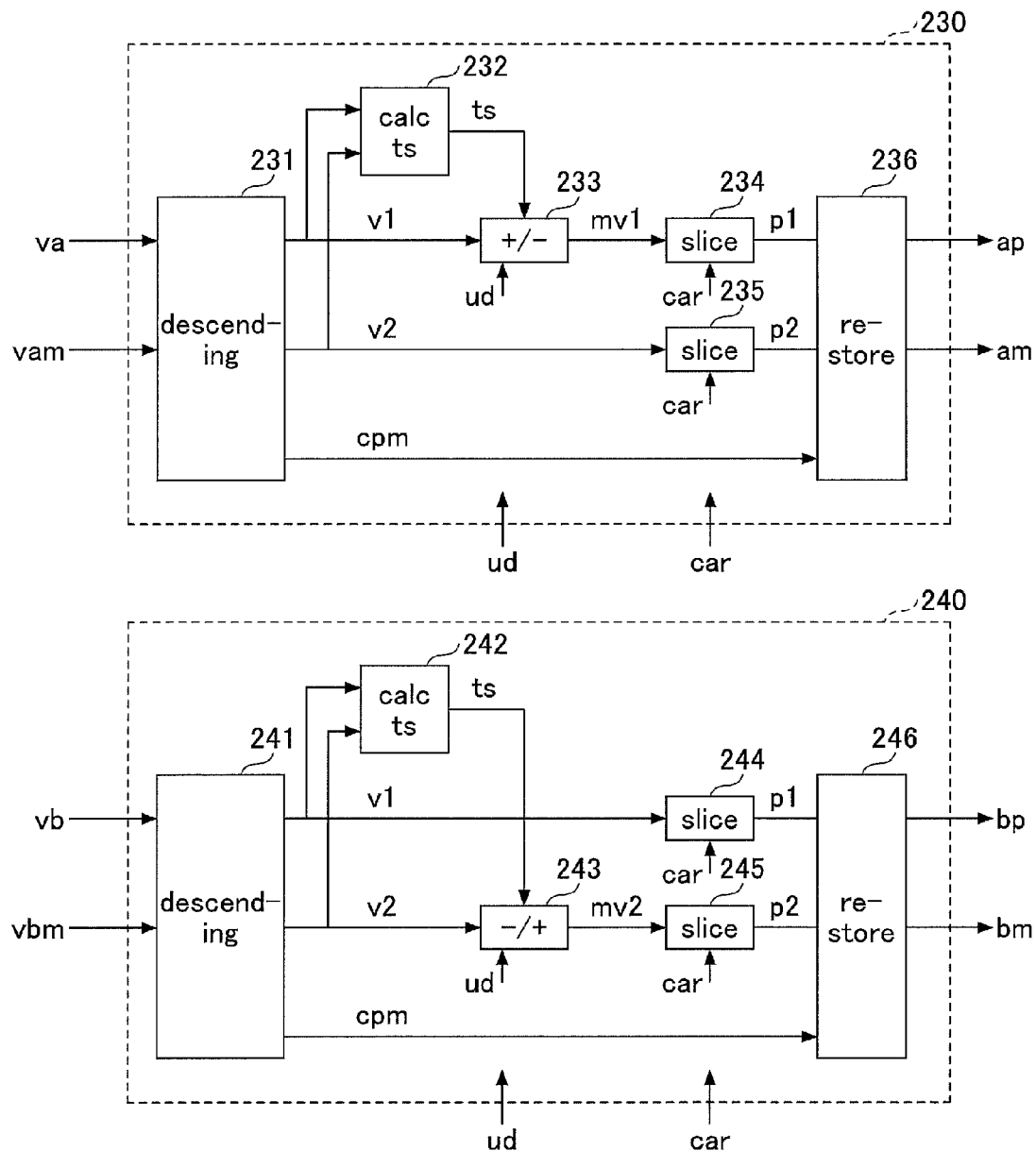
FIG. 3 is a diagram for explaining a PWM shift unit according to the first embodiment.

Next, with reference to FIG. 3, the PWM shift units 230, 240 according to the embodiment will be described. FIG. 3 is a diagram for explaining the PWM shift unit according to the first embodiment.

In FIG. 3, signals with the same reference character appear in the respective PWM shift units 230, 240. Because the signals are signals output by the same operation, the explanation will be given using the same reference character name. Actually, because the signals exist in the respective PWM shift units 230, 240, the signals are different from each other.

At first, the PWM shift unit 230 will be described. The PWM shift unit 230 according to the embodiment includes a sorting unit 231, a pulse shift amount calculation unit 232, an addition and subtraction unit 233, comparators 234, 235, and a sorting restoration unit 236.

Moreover, the PWM shift unit 240 includes a sorting unit 241, a pulse shift amount calculation unit 242, an addition and subtraction unit 243, comparators 244, 245, and a sorting restoration unit 246.

The sorting units 231, 241 according to the embodiment assign v1 to an electric voltage equivalent value with greater value of the two input electric voltage equivalent values, i.e. the electric voltage equivalent value va and the reversion electric voltage equivalent value vam (the electric voltage equivalent value vb and the reversion electric voltage equivalent value vbm), and assigns v2 to the electric voltage equivalent value with less value. Moreover, the sorting units 231, 241 output results of sorting as a signal cpm to the sorting restoration units 236, 246.

The sorting unit 231 according to the embodiment, when the electric voltage equivalent value va is the same as the reversion electric voltage equivalent value vam or more, assigns 1 to the value of the signal cpm, and otherwise assigns 0 to the value of the signal cpm. Moreover, the sorting unit 241, when the electric voltage equivalent value vb is the same as the reversion electric voltage equivalent value vbm or more, assigns 1 to the value of the signal cpm, and otherwise assigns 0 to the value of the signal cpm.

A description example of operations of the respective sorting units 231, 241 according to the embodiment is illustrated in FIG. 4. FIG. 4 is a diagram depicting an example of description when the operation of the sorting unit is described by a program. FIG. 4 illustrates an example in which the program is described in C language.

Figures 5, 6:
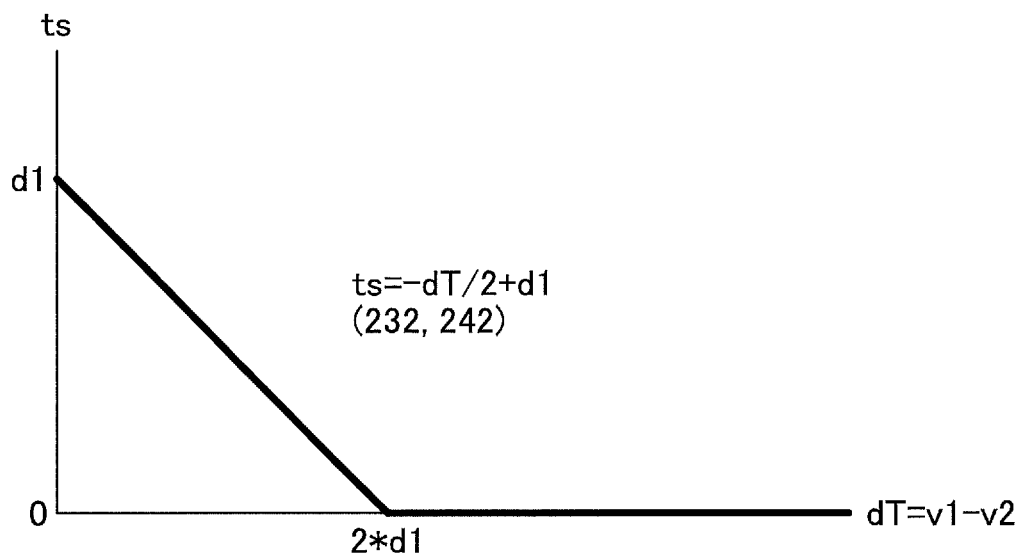
FIG. 5 is a diagram for explaining a condition of pulse shift.
FIG. 6 is a diagram depicting a description example when an operation of a pulse shift amount calculation unit is described by a program.

The pulse shift amount calculation unit 232 according to the embodiment, as illustrated in FIG. 5, when a difference dT of the electric voltage equivalent value v1, v2 (dT=v1−v2), which are arranged in descending order, is a predetermined value (2×d1) or less, starts calculation for a shift amount is proportional to the difference dT. That is, in the embodiment, a condition for shifting the PWM pulse signal is that the difference dT between the electric voltage equivalent values v1, v2 is the predetermined value (2×d1) or less. A configuration and operation of the pulse shift amount calculation unit 242 are the same as the pulse shift amount calculation unit 232. FIG. 5 is a diagram for explaining the condition for the pulse shift.

The value d1 in the embodiment is a constant that is determined preliminarily, and preferably corresponds to electric current detectable time with the least width to be ensured by the pulse shift. The value d1 in the embodiment is determined, for example, by performance such as a bandwidth of an analog element in an amplifier, a selector or the like included in the motor control apparatus 100.

In the following description, for the simplicity of explanation, a unit of electric voltage and a unit of time such as a pulse width or a shift amount are assumed to be the same. This is because a digital circuit becomes often simple when a least time unit is treated as a clock cycle in a fast system clock. For example, assuming that the PWM cycle is 100 (clock time) and the maximum electric voltage to be input is 100 (digital quantity), designing that a pulse width changes from 0 to 100 for an electric voltage from 0 to 100. At this time, an electric voltage and time can be treated as the same unit.

In FIG. 6, a description example of an operation of calculation for a shift amount ts by the pulse shift amount calculation unit 232 is illustrated. FIG. 6 is a diagram depicting a description example when the operation of the pulse shift amount calculation unit is described by a program. FIG. 6 illustrates an example in which the program is described in C language.

The pulse shift amount calculation unit 232 according to the embodiment is found to set the shift amount ts to (−dT/2)+d1 from the description 61, when the difference dT is the predetermined value (2×d1) or less.

The addition and subtraction unit 233 according to the embodiment, for the descending section (signal ud=1) for the carrier signal car, adds the shift amount ts to the electric voltage equivalent value v1, and for the ascending section (signal ud=0) for the carrier signal car, subtracts the shift amount ts from the electric voltage equivalent value v1, to output a modified electric voltage equivalent value mv1.

The addition and subtraction unit 243 according to the embodiment, for the descending section (signal ud=1) for the carrier signal car, subtracts the shift amount ts from the electric voltage equivalent value v2, and for the ascending section (signal ud=0) for the carrier signal car, adds the shift amount ts to the electric voltage equivalent value v2, to output a modified electric voltage equivalent value mv2.

Description examples of the respective operations of the addition and subtraction unit 233 and the addition and subtraction unit 243 are illustrated in in FIG. 7. FIG. 7 is a diagram depicting a description example when the operation of the addition and subtraction unit is described by a program. FIG. 7 illustrates an example in which the program is described in C language.

As can be seen from the description of the operation of the addition and subtraction unit 233, a set of an ascending section of the carrier signal car and a descending section is a cycle of the PWM pulse signal. Therefore, through a cycle of the PWM pulse signal, an average of the electric voltage equivalent value is constant at v1.

Moreover, also from the description of the operation of the addition and subtraction unit 243, through a cycle of the PWM pulse signal, an average of the electric voltage equivalent value is found to be constant at v2.

The comparator 234 according to the embodiment compares the carrier signal car with the modified electric voltage equivalent value mv1, and outputs a result of comparison as a pulse signal p1. The comparator 235 according to the embodiment compares the carrier signal car and the electric voltage equivalent value v2, and outputs a result of comparison as a pulse signal p2.

Moreover, the comparator 244 according to the embodiment compares the carrier signal car and the electric voltage equivalent value v1, and outputs a result of comparison as a pulse signal p1. The comparator 245 according to the embodiment compares the carrier signal car with the modified electric voltage equivalent value mv2, and outputs a result of comparison as a pulse signal p2.

A description example of the operations up to here of the PWM shift units 230, 240 is illustrated in FIG. 8. FIG. 8 is a diagram depicting a description example when the operation of the PWM shift unit is described by a program. FIG. 8 illustrates an example in which the program is described in C language.

Among descriptions illustrating the operations of the PWM shift unit 230 in FIG. 8, the right hand side of the description 71 in the first line indicates that when the modified electric voltage equivalent value mv1 is greater than the carrier signal car, logic 1 (H level) is set, and otherwise logic 0 (L level) is output. In the embodiment, the same meaning is assumed to be included also in the other descriptions illustrating operations of the PWM shift units 230, 240.

The sorting restoration units 236, 246 according to the embodiment return the signals that are sorted in a descending order by the sorting units 231, 241 to the original order. Therefore, the sorting restoration units 236, 246 use signal cpm for the result or sorting.

Description examples of the respective operations of the sorting restoration units 236, 246 are illustrated in in FIG. 9. FIG. 9 is a diagram depicting a description example when the operation of the sorting restoration units is described by a program. FIG. 9 illustrates an example in which the program is described in C language.

According to the description of operation of the sorting restoration unit 236 in FIG. 9, the sorting restoration unit 236 outputs, when a value of the signal cpm is 0, the pulse signal p1 as a pulse signal ap and the pulse signal p2 as a pulse signal am, and when the value of the signal cpm is not 0, the pulse signal p2 as a pulse signal ap and the pulse signal p1 as a pulse signal am.

Moreover, according to the description of operation of the sorting restoration unit 246 in FIG. 9, the sorting restoration unit 246 outputs, when a value of the signal cpm is 0, the pulse signal p1 as a pulse signal by and the pulse signal p2 as a pulse signal bm, and when the value of the signal cpm is not 0, the pulse signal p2 as a pulse signal by and the pulse signal p1 as a pulse signal bm.

Figure 10:
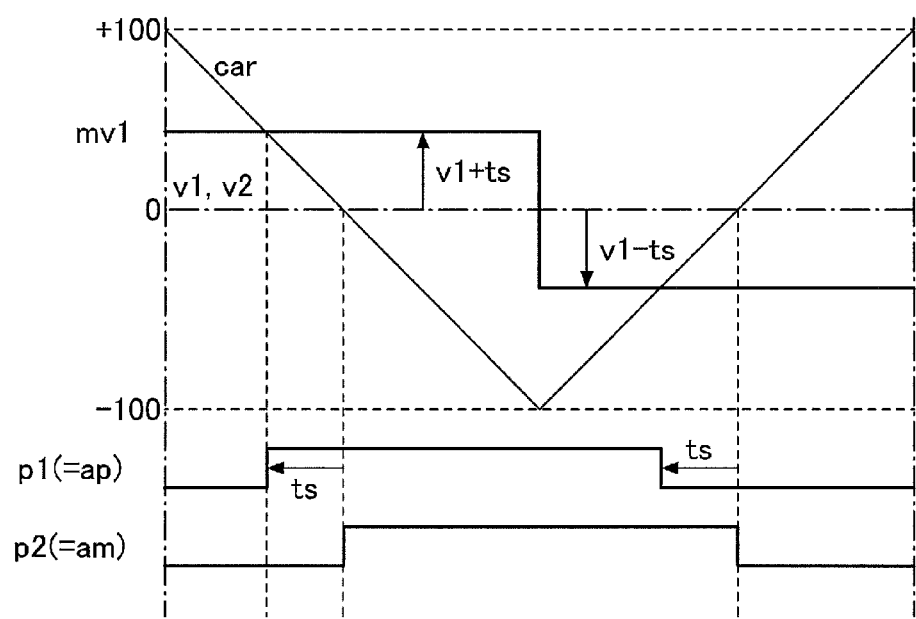
FIG. 10 is a first diagram depicting an example of an operation waveform of the PWM shift unit.

Next, with reference to FIG. 10 an operation of the PWM shift unit 230 according to the embodiment will be described. FIG. 10 is a first diagram depicting an example of an operation waveform of the PWM shift unit.

In FIG. 10, a case where a difference between the input electric voltage equivalent value va and the reversion electric voltage equivalent value vam is almost 0, and therefore even if being sorted the electric voltage equivalent values v1, v2 are almost 0 is illustrated.

In FIG. 10, the carrier signal car is a triangular wave having amplitude ±100, and repeats ascending and descending. To the electric voltage equivalent value v1, by the pulse shift amount calculation unit 232 and the addition and subtraction unit 233, in a first half of a cycle of the carrier signal car (descending section: signal ud=1), a shift amount ts is added. Moreover, from the electric voltage equivalent value v1, by the pulse shift amount calculation unit 232 and the addition and subtraction unit 233, in a second half of the cycle of the carrier signal car (ascending section: signal ud=0), the shift amount ts is subtracted, and thereby a modified electric voltage equivalent value mv1 is obtained. The electric voltage equivalent value v2 is unchanged.

Next, the PWM shift unit 230 obtains pulse signals p1, p2 that are results of comparison of the modified electric voltage equivalent value mv1 and the electric voltage equivalent value v2 with the carrier signal car, respectively.

In FIG. 10, the pulse signal p1 is found to be shifted forward by a time equivalent to the shift amount ts. Moreover, a pulse width of the pulse signal p1 is maintained and the same as a case where the shift amount ts is 0. In FIG. 10, the pulse signal p1 is a pulse signal ap that is an output from the PWM shift unit 230, and the pulse signal p2 is a pulse signal am that is an output from the PWM shift unit 230.

Figure 11:
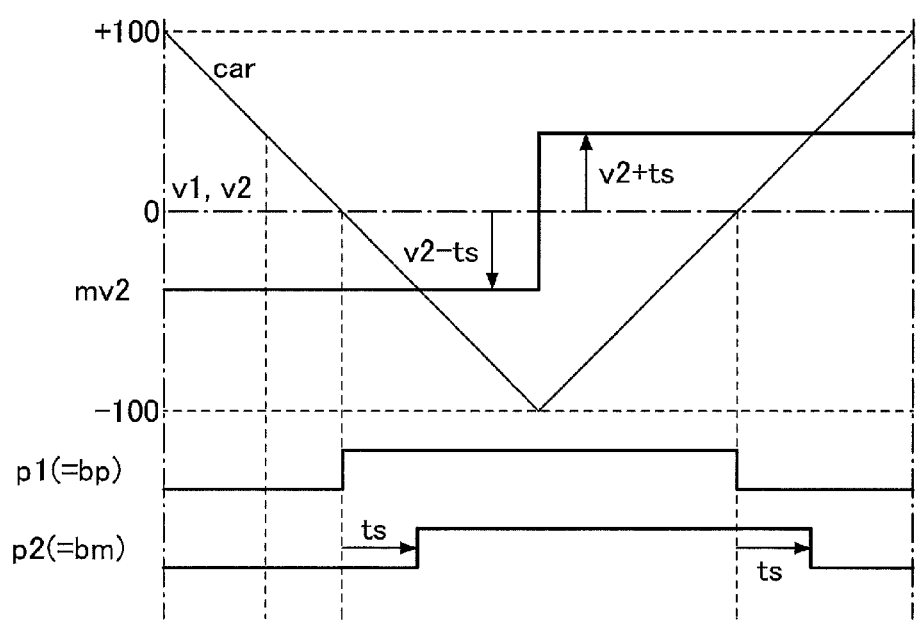
FIG. 11 is a second diagram depicting an example of the operation waveform of the PWM shift unit.

Next, an operation of the PWM shift unit 240 will be described. FIG. 11 is a second diagram depicting an example of an operation waveform of the PWM shift unit.

In FIG. 11, a case where a difference between the input electric voltage equivalent value vb and the reversion electric voltage equivalent value vbm is almost 0, and therefore even if being sorted the electric voltage equivalent values v1, v2 are almost 0 is illustrated.

In FIG. 11, the carrier signal car is a triangular wave having amplitude ±100, and repeats ascending and descending.

In FIG. 11, the electric voltage equivalent value v1 is unchanged as it is.

From the electric voltage equivalent value v2, by the pulse shift amount calculation unit 242 and the addition and subtraction unit 243, in a first half of a cycle of the carrier signal car (descending section: signal ud=1), a shift amount ts is subtracted. Moreover, to the electric voltage equivalent value v2, by the pulse shift amount calculation unit 242 and the addition and subtraction unit 243, in a second half of the cycle of the carrier signal car (ascending section: signal ud=0), the shift amount ts is added, and thereby a modified electric voltage equivalent value mv2 is obtained.

Next, the PWM shift unit 240 obtains pulse signals p1, p2 that are results of comparison of the electric voltage equivalent value v1 and the modified electric voltage equivalent value mv2 with the carrier signal car, respectively.

In FIG. 11, the pulse signal p2 is found to be shifted forward by a time equivalent to the shift amount ts. Moreover, a pulse width of the pulse signal p2 is maintained and the same as a case where the shift amount ts is 0. In FIG. 11, the pulse signal p1 is a pulse signal by that is an output from the PWM shift unit 240, and the pulse signal p2 is a pulse signal bm that is an output from the PWM shift unit 240.

In the embodiment, as can be seen from FIG. 10 and FIG. 11, when a difference between widths of two pulse signals output from the PWM shift units 230, 240, respectively, is small, in the PWM shift unit 230 one of the pulse signals is shifted forward, and in the PWM shift unit 240 the other of the pulse signals is shifted backward. The case where the difference between the widths of two pulse signals is small is, for example, a case where a difference between the electric voltage equivalent value and the reversion electric voltage equivalent value is almost zero.

Therefore, in the embodiment, as described below, coil electric currents flowing in the electric current detectors 101, 102 inserted in the common bus of the H-bridge units 250, 260 can be sampled at different times.

Figure 12:
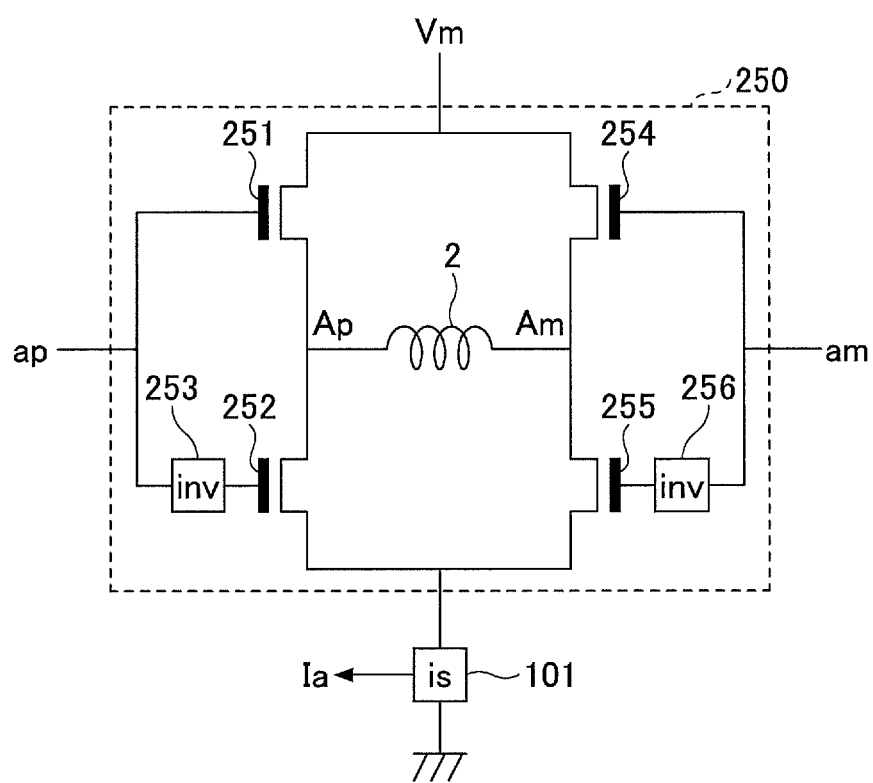
FIG. 12 is a diagram for explaining an H-bridge unit and an electric current detector.

Next, with reference to FIG. 12, the H-bridge unit 250 according to the embodiment and the electric current detector 101 will be described. FIG. 12 is a diagram for explaining the H-bridge unit and the electric current detector.

The H-bridge unit 250 according to the embodiment includes switch elements 251, 252, 254, 255, and invertors 253, 256. For the respective switch elements, FET (Field Effect Transistor) or the like is used. In the embodiment, when a level of gate input of FET is "1 (H level)", a switch is assumed to be ON.

In the H-bridge unit 250, power source sides of the switch elements 251, 254 that are upper side switches are commonly connected. Moreover, ground sides of the switch element 252, 255 that are lower side switches are also commonly connected. In the embodiment, the power source sides and the ground sides are referred to as a power source side common bus and a ground side common bus.

The invertors 253, 256 are reversing logics, i.e. on the same coil terminal side, any one of the upper switch and the lower switch is ON.

In this configuration, an ON/OFF state and a level of a coil terminal for the pulse signal ap and the pulse signal am are illustrated as follows in TABLE 1. In TABLE 1, G represents a ground potential, and Vm is an electric voltage of power source for the stepping motor 1.

TABLE 1

| ap | am | Switch element 251 | Switch element 252 | Switch element 254 | Switch element 255 | Ap | Am |
|----|----|----|----|----|----|----|----|
| 0 | 0 | OFF | ON | OFF | ON | G | G |
| 0 | 1 | OFF | ON | ON | OFF | G | Vm |
| 1 | 0 | ON | OFF | OFF | ON | Vm | G |
| 1 | 1 | ON | OFF | ON | OFF | Vm | Vm |

The PWM pulse signals Ap, Am are generally pulses where an H level of is the electric voltage of power source Vm, and a L level is the ground potential. In the H-bridge unit 250, when levels of the PWM pulse signal Ap and the PWM pulse signal Am are different from each other, a coil electric current Ia (shunt electric current) flows from the power source through the A-phase coil 2 to the ground side common bus.

Moreover, in the H-bridge unit, when the levels of the PWM pulse signal Ap and the PWM pulse signal Am are the same (In TABLE 1, Vm and Vm, or G and G), the coil electric current Ia refluxed in switches inside the bridge and does not flow to the ground side or the power source side.

For example, when the levels of the PWM pulse signals Ap, Am are Vm, the coil electric current is refluxed by the switch elements 251, 254 that are the upper side switches and the A-phase coil 2. Moreover, when the levels of the PWM pulse signals Ap, Am are G, the coil electric current is refluxed by the switch elements 252, 255 that are the lower side switches and the A-phase coil 2.

The electric current detector 101 according to the embodiment is inserted between the ground side common bus and the ground. Generally, as the electric current detector 101, a resister with small value (shunt resister) is inserted. The resister with small value is, for example, a resister of one tenth or less of resistance of the A-phase coil 2.

In the embodiment, a potential difference between both ends of the electric current detector 101 is a signal indicating the coil electric current Ia flowing in the A-phase coil 2.

In the embodiment, because the electric current detector 101 has small resistance and an electric potential on the ungrounded side is close to the ground potential, even in a case of amplifying at the subsequent stage or input into an A/D converter, high voltage resistance is not required. Therefore, according to the embodiment, cost of the motor control apparatus 100 can be prevented from increasing.

Because configurations of the H-bridge unit 260 and the electric current detector 102 according to the embodiment are the same as the H-bridge unit 250 and the electric current detector 101, an explanation will be omitted.

Next, with reference to FIG. 13, an operation until outputting the coil electric current equivalent value ia, ib in the motor control apparatus 100 according to the embodiment will be described.

Figure 13:
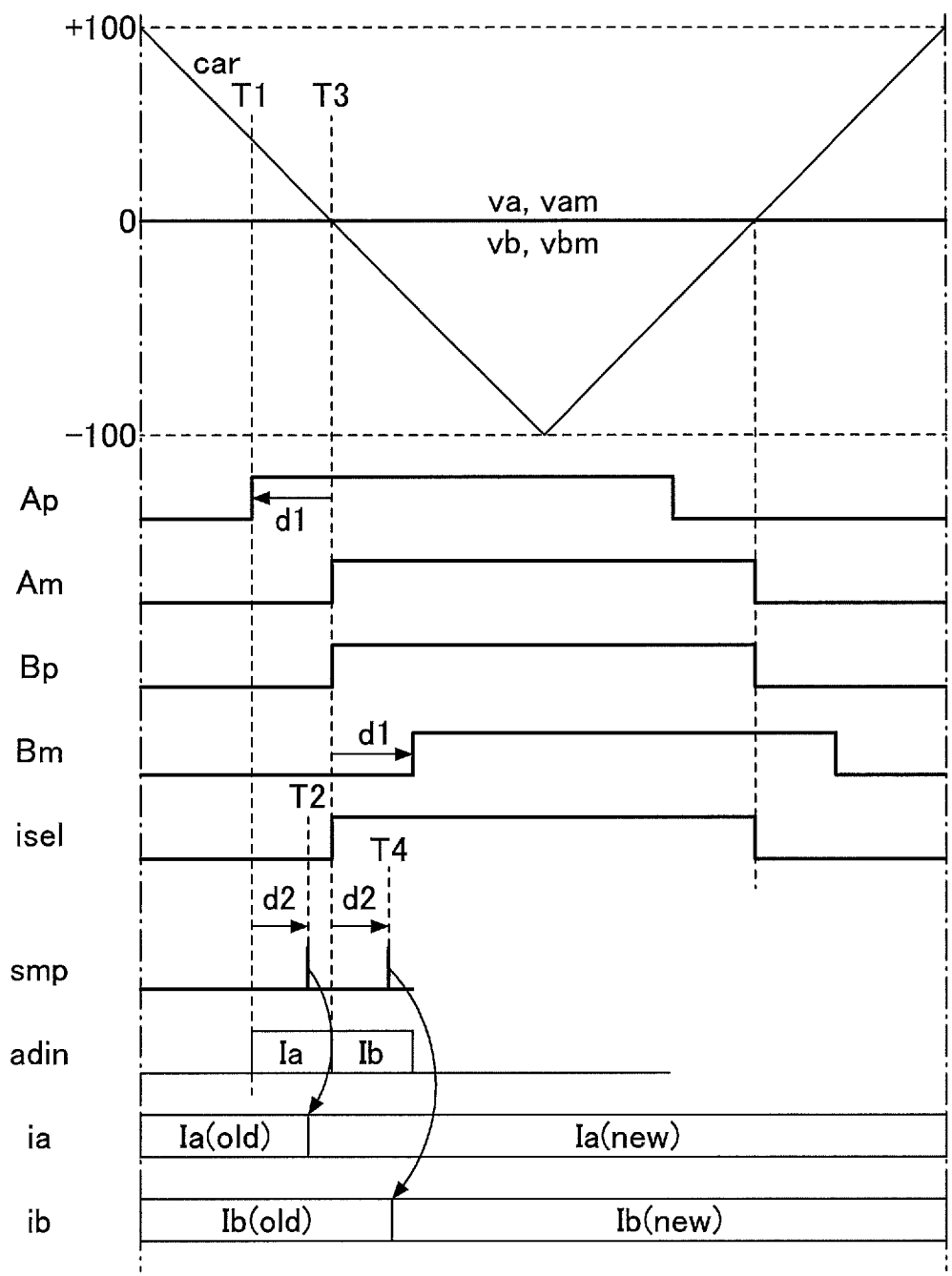
FIG. 13 is a first operation waveform diagram for explaining an operation of the motor control apparatus according to the first embodiment.

FIG. 13 is a first operation waveform diagram for explaining an operation of the motor control apparatus according to the first embodiment. In FIG. 13, operation waveform of receiving an input of the electric current equivalent values va, vb, through the PWM pulse signals Ap, Am, Bp, Bm applied to coil terminals of the A-phase coil 2 and the B-phase coil 3, respectively, and obtaining the coil electric current equivalent value ia of the A-phase coil 2 and the coil electric current equivalent value ib of the B-phase coil 3, is illustrated.

In FIG. 13, the electric voltage equivalent values va, vb are assumed to be positive values almost around 0. Therefore, the reversion electric voltage equivalent values vam, vbm are values around 0, and levels of the values va, vb, vam, vbm are made to be almost 0.

Pulse signals of results of comparing the four values with the carrier signal car have duties which are around 50%. Unless the pulse signal is shifted, all the pulse signals may overlap with each other at the same timing. Then, an electric current does not flow in the electric current detectors 101, 102 inserted in the ground side common bus of the H-bridge parts 250, 260, and the electric current detection may become impossible.

Then, in the embodiment, according to the action by the PWM shift unit 230, the PWM pulse signal Ap applied to one of the coil terminals of the A-phase coil 2 is shifted forward by a constant d1. That is, the PWM shift unit 230 causes the PWM pulse signal Ap to rise earlier by a time period indicated by the constant d1 than a rise of the PWM pulse signal Am.

Moreover, in the embodiment, according to the action by the PWM shift unit 230, the PWM pulse signal Bp applied to one of the coil terminals of the B-phase coil 3 is shifted backward by a constant d1. That is, the PWM shift unit 240 causes the PWM pulse signal Bm to rise later by a time period indicated by the constant d1 than a rise of the PWM pulse signal Bp.

Therefore, in the embodiment, as illustrated in FIG. 13, different sections of logic of pulses between the coil terminals are ensured around the rising edge of duty of 50%, A-phase on the front side and B-phase on the back side. In other words, in the embodiment, in the A-phase, different sections of logic of pulses between coil terminals are ensured at an earlier timing than the rising edge of duty of 50%. Moreover, in the embodiment, in the B-phase, different sections of logic of pulses between coil terminals are ensured at a later timing than the rising edge of duty of 50%.

Therefore, in the embodiment, at this time, coil electric currents Ia, Ib flow via the lower side switch of the H-bridge units 250, 260, and thereby respective electric currents are detected.

Moreover, in the embodiment, the selection instruction signal isel selects points at which a value of the carrier signal car becomes 0, i.e. selects the coil electric current Ia before the rising changing point (rising edge) of duty of 50%, and selects the coil electric current Ib after the rising changing point. Therefore, in the adin signal that will be an input of the A/D converter 104, the coil electric current Ia appears in a period indicated by the constant d1 before the rising changing point of the carrier signal car, and the coil electric current Ib appears in a period indicated by the constant d1 after the rising changing point.

The A/D converter 104, in response to the sampling trigger signal smp, samples the adin signal, in which the coil electric currents Ia and the coil electric currents Ib appear, respectively, and digitizes the signal.

In the following, a process of generating the sampling trigger signal smp by the timing generator 106 will be described.

The timing generator 106 generates a first sampling trigger signal smp at a timing T2 at which a time period indicated by a constant d2 has elapsed from a timing T1 as a starting point. The timing T1 is a timing prior to the timing, at which the electric voltage equivalent value and the reversion electric voltage equivalent value become 0, by a time period indicated by the constant d1 in the descending section of the carrier signal car. The constant d2 in the embodiment is determined in advance depending on the constant d1.

The constant d2 preferably corresponds to electric current detectable time with the least width to be ensured by the pulse shift, in the same way as the constant d1. The value d2 in the embodiment is determined, for example, by performance such as a bandwidth of an analog element in an amplifier, a selector or the like included in the motor control apparatus 100. Moreover, the constant d2 in the embodiment may be a value less than or equal to the constant d1.

Subsequently, the timing generator 106 generates a second sampling trigger signal smp at a timing T4 at which the time period indicated by the constant d2 has elapsed from a timing T3 as a starting point. The timing T3 is a timing at which the electric voltage equivalent value and the reversion electric voltage equivalent value become 0 in the descending section of the carrier signal car.

That is, the operation of generating the sampling trigger signal smp by the timing generator 106 will be described as follows:

smp[1]=(ud==1) & (car==(d1−d2)); //first smp[2]=(ud==1) & (car==(0−d2)); //second In the embodiment, the constant d2 is less than or equal to the value of the constant d1, and thereby the coil electric current Ia is sampled by the first sampling trigger signal smp, and the coil electric current Ib is sampled by the second sampling trigger signal smp.

At this time, the timing T2 at which the first sampling trigger signal smp is supplied to A/D conversion is assumed to be the timing T3 which is a changing (rising) edge corresponding time of duty of 50% of the PWM pulse signal Am, or a fixed timing prior thereto.

Here, the fixed timing is specifically a timing at which the time period indicated by the constant d2 has elapsed from the timing T1. In other words, the timing T2 is the timing T3 or a timing prior to the timing T3 by a predetermined time period.

Moreover, the timing T4 at which the second sampling trigger signal smp is supplied to A/D conversion is assumed to be a fixed timing behind the timing T3 which is a changing (rising) edge corresponding time of duty of 50% of the PWM pulse signal Bp.

Here, the fixed timing is specifically a timing at which the time period indicated by the constant d2 has elapsed from the timing T3. In other words, the timing T4 is a timing at which a predetermined time period has elapsed from the timing T3.

The coil electric current that is sampled by the A/D converter 104 and becomes a digital value is latched by the demultiplexer 105 with an A-phase electric current latch signal sta which is generated behind the first sampling trigger signal smp by a predetermined time period (fixed time period necessary for the A/D conversion, almost 0 in this case), as the coil electric current equivalent value ia. Moreover, the coil electric current is latched by the demultiplexer 105 with a B-phase electric current latch signal stb which is generated behind the second sampling trigger signal smp by a predetermined time period (fixed time period necessary for the A/D conversion, almost 0 in this case), as the coil electric current equivalent value ib.

As described above, according to the embodiment, by triggering the A/D converter 104 sequentially, two coil electric currents Ia, Ib can be sampled. Therefore, according to the embodiment, compared with the case where two A/D converters are provided, cost of detecting coil electric current of the stepping motor 1 can be reduced.

Moreover, because the timing of sampling the coil electric currents Ia, Ib may be a fixed timing independently from an electric voltage or an electric current level, i.e. a duty of the PWM pulse signal, the timing generation circuit or the like can be simplified and the cost can be reduced.

Figure 14:
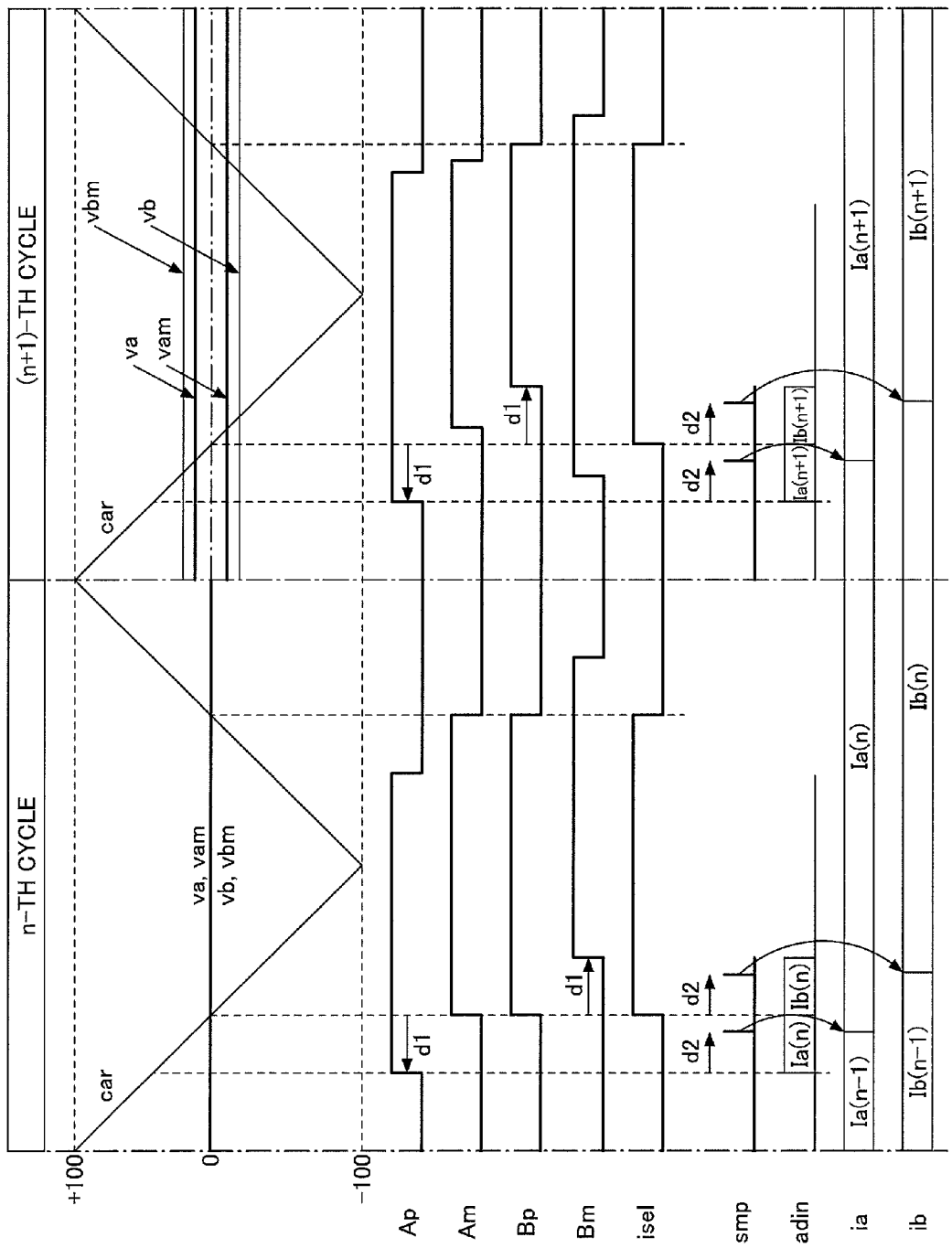
FIG. 14 is a second operation waveform diagram for explaining the operation of the motor control apparatus according to the first embodiment.

Next, with reference to FIG. 14, the operation of the motor control apparatus 100 according to the embodiment will be described further. FIG. 14 is a second operation waveform diagram for explaining the operation of the motor control apparatus according to the first embodiment.

FIG. 14 is obtained by adding the PWM pulse signal of one cycle to FIG. 13.

The operation waveform of n-th cycle in FIG. 14 is the same as in FIG. 13. In the (n+1)-th cycle in FIG. 14, the electric voltage equivalent value va is a slightly positive level, and the electric voltage equivalent value vb is a relatively greater negative level. In FIG. 14, in both cycles, because differences between pulse widths of the respective PWM pulse signals are less than "2×d1" that is the condition for the pulse shift illustrated in FIG. 5, the PWM shift units 230, 240 start calculation of shift amount is of the PWM pulse signal.

The difference between pulse widths of the respective PWM pulse signals is a difference between pulse widths of the PWM pulse signal Ap and the PWM pulse signal Am and a difference between pulse widths of the PWM pulse signal Bp and the PWM pulse signal Bm.

In the example of FIG. 14, also in the (n+1)-th cycle, different sections of level (logic) of the PWM pulse signals applied to the coil terminals are ensured around the rising edge of duty of 50%, A-phase on the front side and B-phase on the back side. Therefore, in the embodiment, at this time the coil electric currents Ia, Ib flows in the lower side switches of the H-bridge units 250, 260, and electric current is found to be possible to be detected. Moreover, the timing of sampling the coil electric currents Ia, Ib is fixed, and is found to only have to be the same as the n-th cycle.

As described above, according to the embodiment, cost of detecting coil electric current of a stepping motor can be reduced.

In the prior art, because the electric current detection is performed for two H-bridge circuit at the same timing, in order to use electric currents detected from the respective H-bridge circuits for digital processes, two A/D convertors are required, and cost becomes higher.

According to the embodiment, cost regarding the detection of coil electric current can be reduced.

Second Embodiment

In the following, a second embodiment will be described. The second embodiment describes a motor control apparatus that includes the motor control apparatus according to the first embodiment and an electric current control unit. In the description in the second embodiment, to a member having the same functional configuration as the first embodiment, the reference character used in the description in the first embodiment will be assigned and an explanation thereof will be omitted.

Figure 15:
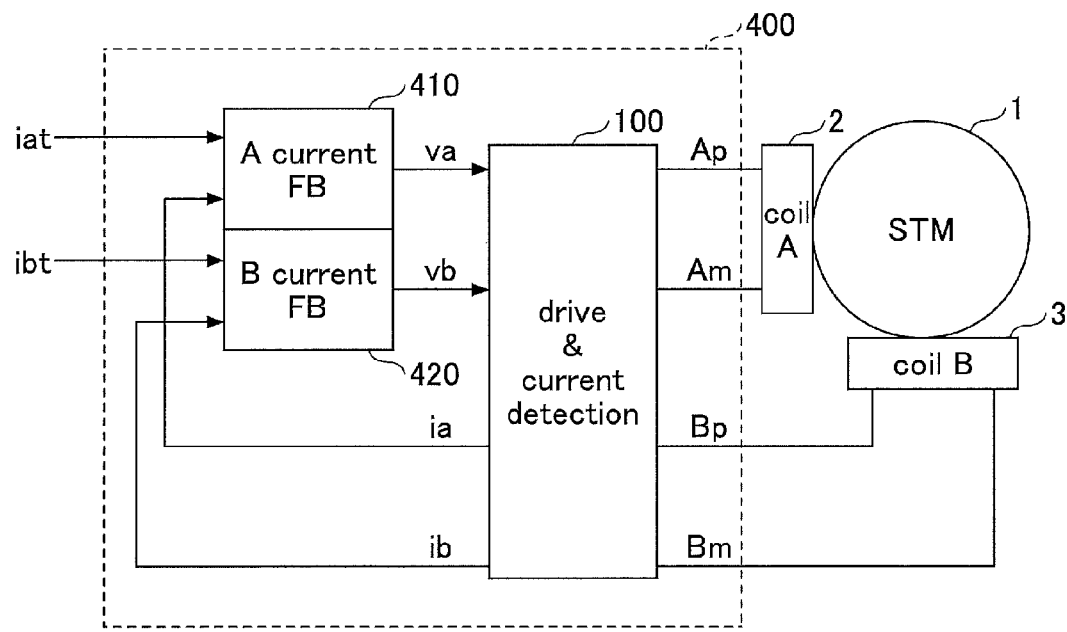
FIG. 15 is a diagram for explaining a motor control apparatus according to a second embodiment.

FIG. 15 is a diagram for explaining the motor control apparatus according to the second embodiment. The motor control apparatus 400 in the embodiment includes a motor control apparatus 100, and electric current control units 410, 420. The motor control apparatus 400 according to the embodiment performs control to adjust coil electric currents Ia, Ib detected in the motor control apparatus 100 to target values.

The electric current control unit 410 according to the embodiment performs feedback control for an A-phase electric voltage equivalent value va so as to adjust an A-phase coil electric current equivalent value is to a target value iat.

The electric current control unit 420 according to the embodiment performs feedback control for a B-phase electric voltage equivalent value vb so as to adjust a B-phase coil electric current equivalent value ib to a target value ibt.

Figure 16:
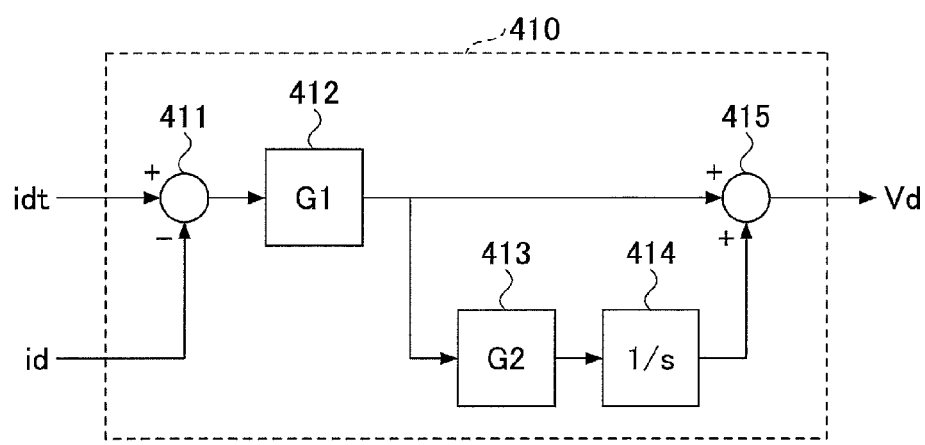
FIG. 16 is a diagram depicting a block line diagram of an electric current control unit according to the second embodiment.

As a configuration of the electric current control units 410, 420 according to the embodiment, a publicly known proportional/integral control can be used. FIG. 16 is a diagram depicting a block line diagram of the electric current control unit according to the second embodiment. Because the electric current control units 410, 420 have the same configuration, in FIG. 16 the electric current control unit 410 will be described.

The electric current control unit 410 includes a subtractor 411, a gain element 412, a gain element 413, an integral element 414 (1/s where s is the Laplace operator), and an adder 415, all of which are publicly known techniques.

In the electric current control unit 410 according to the embodiment, transfer characteristic expressed by the following formula (1) is obtained. With proper constants for the gain element 412 and the gain element 413, the electric voltage equivalent values va, vb are calculated, and the coil electric current equivalent values ia, ib are controlled so as to approach the respective target values iat, ibt.

$$va = (iat - ia) \times G1 \times (1 + G2 \times (1/s))$$

$$vb = (ibt - ib) \times G1 \times (1 + G2 \times (1/s)) \quad \text{formula (1)}$$

In the embodiment, by inputting the target value iat and the target value ibt with a predetermined amplitude and in a relation where phases are shifted from each other by 90 degrees, the coil electric currents Ia, Ib of the A-phase coil 2 and the B-phase coil 3 are controlled, and the stepping motor 1 is rotated, or stopping is maintained.

The control is an open loop as position control. However, because the control is simple and stopping and a slow operation are possible, the control can be applied upon slow control or stopping maintaining control, in which position estimation is impossible, in a third embodiment which will be described later.

Third Embodiment

A third embodiment will be described as follows. The third embodiment describes a motor drive control apparatus including the motor control apparatus 100 according to the first embodiment. In the description of the third embodiment, to a member having the same functional configuration as the first embodiment, the reference character used in the description in the first embodiment will be assigned and an explanation thereof will be omitted.

Figure 17:
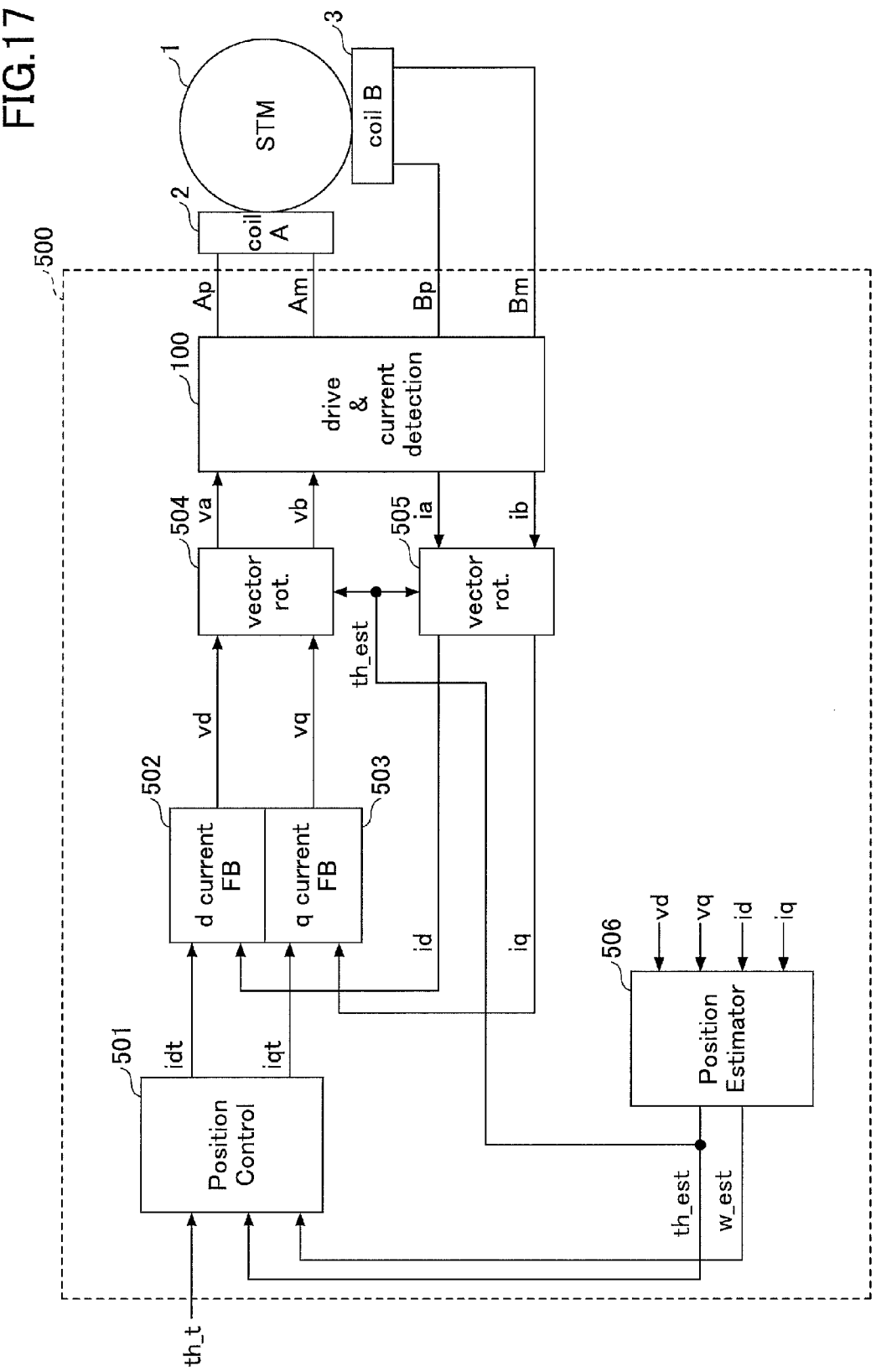
FIG. 17 is a diagram for explaining a motor drive control apparatus according to a third embodiment.

FIG. 17 is a diagram for explaining the motor drive control apparatus according to the third embodiment. The motor drive control apparatus 500 according to the embodiment further performs rotation conversion for the coil electric currents Ia, Ib detected by the motor control apparatus 100 based on a motor angle, and converts into DC (Direct Current) electric current Id, Iq. Moreover, the motor drive control apparatus 500 according to the embodiment is a closed loop control apparatus that is provided with an electric current control loop that controls the DC electric currents Id, Iq to be adjusted to target values, and further controls a motor position and a speed as a loop outside thereof.

The motor drive control apparatus 500 according to the embodiment includes a position feedback control unit 501, a d-axis electric current control unit 502, a q-axis electric current control unit 503, vector rotation units 504 and 505, a position estimation unit 506 and the motor control apparatus 100.

The position feedback control unit 501 according to the embodiment compares a target position instruction value th_t with position information th_est that indicates a present estimated position of the rotor 4, and outputs amplitude target values idt and iqt for drive electric current depending on a result of comparison. In the embodiment, according to the control, amplitude of the drive electric current is controlled so that the target position instruction value th_t coincides with the position information th_est, and the position of rotor 4 is controlled.

In the embodiment, when the target position instruction value th_t increases or decreases by a constant amount in a unit time, the position information th_est is controlled also to increase or decrease by a constant amount in a unit time. Therefore, the rotor 4 of the stepping motor 1 of the embodiment maintains a rotation at a constant speed. Moreover, in the embodiment, when the target position instruction value th_t stops at a fixed value, the position information th_est is controlled also to stop, i.e. to maintain the present position.

The position feedback control unit 501 will be described later in detail.

The d-axis electric current control unit 502 outputs a d-axis drive electric voltage equivalent value vd so that a d-axis electric current equivalent value id detected by the vector rotation unit 505 coincides with the amplitude target value idt for the d-axis drive electric current. The q-axis electric current control unit 503 outputs a q-axis drive electric voltage equivalent value vq so that a q-axis electric current equivalent value iq detected by the vector rotation unit 505 coincides with the amplitude target value iqt for the q-axis drive electric current. The d-axis electric current control unit 502 and the q-axis electric current control unit 503 according to the embodiment are preferably proportional/integral controller for performing proportional/integral control, for example.

The d-axis electric current control unit 502 and the q-axis electric current control unit 503 will be described later in detail.

The vector rotation unit 504 according to the embodiment is a vector rotation means, rotates the d-axis drive electric voltage equivalent value vd and the q-axis drive electric voltage equivalent value vq by the position information th_est, and outputs an A-phase electric voltage equivalent value va and a B-phase electric voltage equivalent value vb. The operation by the vector rotation unit 504 is expressed by the following formula (2).

[Formula 1]

$$\begin{pmatrix} V_a \\ V_b \end{pmatrix} = \begin{pmatrix} \cos(th) & -\sin(th) \\ \sin(th) & \cos(th) \end{pmatrix} \begin{pmatrix} V_d \\ V_q \end{pmatrix} \quad \text{formula (2)}$$

The drive electric voltage equivalent values vd, vq are outputs from the d-axis electric current control unit 502 and the q-axis electric current control unit 503, and are signals close to direct currents. Because the drive electric voltage equivalent values are rotated by the position information th_est that is equivalent to rotor angles, the electric voltage equivalent values va, vb become alternating current signals. Such vector rotation calculation may be referred to as an axis transformation or a coordinate transformation in the vector control.

The vector rotation unit 505 rotates an A-phase coil electric current equivalent value is and a B-phase coil electric current equivalent value ib by the position information th_est, and outputs the d-axis electric current equivalent value id and the q-axis electric current equivalent value. The operation by the vector rotation unit 505 is expressed by the following formula (3).

[Formula 2]

$$\begin{pmatrix} id \\ iq \end{pmatrix} = \begin{pmatrix} \cos(th) & \sin(th) \\ -\sin(th) & \cos(th) \end{pmatrix} \begin{pmatrix} ia \\ ib \end{pmatrix} \quad \text{formula (3)}$$

Vector rotation directions of the vector rotation units 504, 505 are opposite to each other. The coil electric current equivalent values ia, ib are alternating current signal having a frequency of (rotor rotational speed)×(number of pairs of magnetic poles). Because the coil electric current equivalent values are rotated by the position information th_est that is equivalent to rotor angles, the d-axis electric current equivalent value id and the q-axis electric current equivalent value become signals close to direct currents.

The operation of the vector rotation units 504, 505 will be described later in detail.

The position estimation unit 506 according to embodiment outputs the position information th_est indicating an estimated position of the rotor 4 and an estimated speed w_est from the d-axis drive electric voltage equivalent value vd, the a-axis drive electric voltage equivalent value vq, the d-axis electric current equivalent value id, and the q-axis electric current equivalent value iq.

Specifically, the position estimation unit 506 estimates induced electric voltage, the d-axis electric current equivalent value id and the q-axis electric current equivalent value iq from the drive electric voltage equivalent values vd, vq, based on a mathematical mode for the stepping motor 1, the estimated position th_est and the estimated speed w_est. Then, a method of correcting, as needed, the estimated position th_est and the estimated speed w_esl in the position estimation unit 506 so that the estimated electric currents are the same as the actual d-axis electric current Id and q-axis electric current Iq is known.

Figure 18:
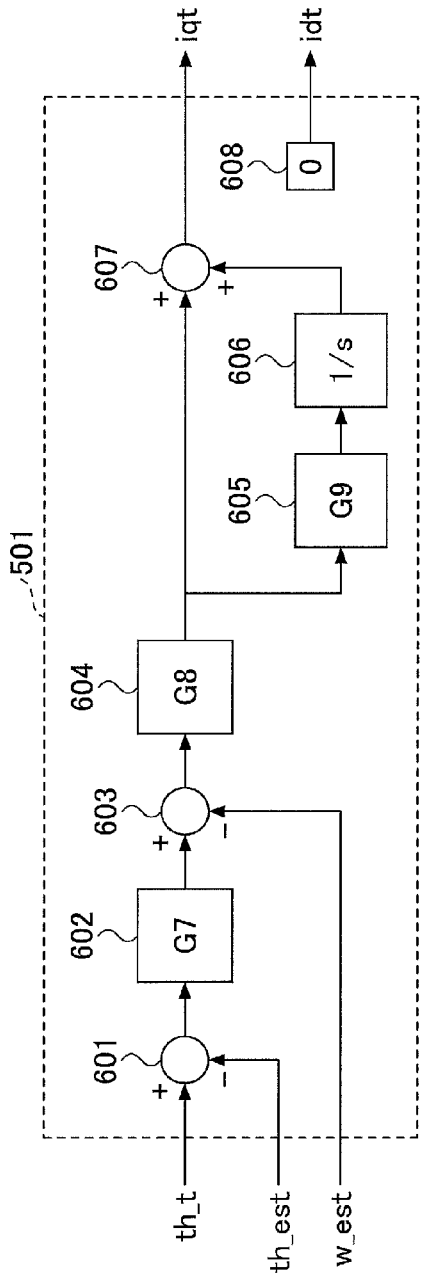
FIG. 18 is a diagram for explaining a position feedback control unit according to the third embodiment.

Next, with reference to FIG. 18, the position feedback control unit 501 according to the embodiment will be described. FIG. 18 is a diagram for explaining the position feedback control unit according to the third embodiment.

The position feedback control unit 501 according to the embodiment includes subtractors 601, 603, gain elements 602, 604, 605, an integrator 606, an adder 607, and a fixed value generator 608.

The subtractor 601 according to the embodiment subtracts the position information (angle) th_est from a target position instruction value th_t input to the position feedback control unit 501. That is, the substactor 601 compares a target position of the rotor 4 with a present estimated position, and calculates a position error.

The gain element 602 amplifies the output (position error) of the subtractor 601 by a factor of a predetermined value G7, and supplies it to the subtractor 603 in the subsequent stage. In the embodiment, the output of the gain element 602 becomes target speed of the rotor 4.

The subtractor 603 subtracts speed information w_est from the output of the gain element 602. The speed information w_est is speed information of rotational speed of the rotor 4. That is, the subtractor 603 compares a target speed of rotation of the rotator 4 with a present speed, and calculates a speed error.

The gain element 604 amplifies the output (speed error) of the subtractor 603 by a factor of a predetermined value G8. The speed error amplified at the gain element 604 is supplied to the gain element 605 and the adder 607.

The gain element 605 amplifies the output of the gain element 604 by a factor of a predetermined value G9, and supplies it to the integrator 606. The output of the integrator 606 (s is the Laplace operator) is supplied to the adder 607.

The adder 607 adds the output of the gain element 604 to the output of the integrator 606, and performs the following calculation (expressing transfer function) for the speed error, to output the amplitude target value iqt for drive electric current.

In the following, the calculation will be described.

The position error of the rotor 4 between the present estimated position and the target position is th_t-th_est;

The difference between the present rotational speed of the rotor 4 and the target speed is (position error)×G7; The speed error of the rotor 4 between the target speed and the present speed is (target speed)−(speed information w_est); and The amplitude target value for drive electric current iqt is (speed error)×G8×(1+G9×(1/s)).

In the embodiment, by configuring as above, in the inner loop of the position feedback control unit 501, feedback control can be performed for the rotational speed of the rotor 4. Therefore, in the embodiment, control of the position of the rotor 4 can be easily stabilized.

Moreover, because the feedback control for the rotational speed in the embodiment is a proportional/integral control, static speed error does not occur and precise control for speed can be performed. Furthermore, in the embodiment, when a position of the rotor 4 gets to a target position and the stepping motor stands still, the target speed is 0 and static speed error does not occur, and deviation for the target position also does not occur.

The amplitude target value of drive electric current iqt may be calculated using only amplification of position error. In this case, calculation using speed error w_est is not essential. When the amplitude target value iqt is calculated using only amplification of position error, for example, for position error, the amplitude target value of drive electric current iqt may be obtained by the publicly known PID (Proportional-Integral-Derivative) calculation.

In the embodiment, the target amplitude values idt and iqt correspond to the d-axis drive electric current Id and the q-axis drive electric current Iq in the vector control. Then, because the q-axis drive electric current Iq indicates a torque, as a simple control method, a method of controlling only the q-axis drive electric current Iq and fixing the d-axis drive electric current Id to 0 is known. In the embodiment, using the above method, by the fixed value generation unit 608, the target amplitude value idt for the d-axis drive electric current is fixed to 0.

Next, the d-axis electric current control unit 502 and the q-axis electric current control unit 503 according to the embodiment will be described. Because configurations of the d-axis electric current control unit 502 and the q-axis electric current control unit 503 according to the embodiment are the same as the electric current control unit 410 according to the second embodiment, an explanation thereof will be omitted.

In the embodiment, the calculation processing according to the transfer function expression is as the following formula (4), and the PID control is enabled.

$$vd=(idt-id) \times G1 \times (1+G2 \times (1/s))$$

$$vq=(iqt-iq) \times G1 \times (1+G2 \times (1/s)) \quad \text{formula (4)}$$

Figure 19:
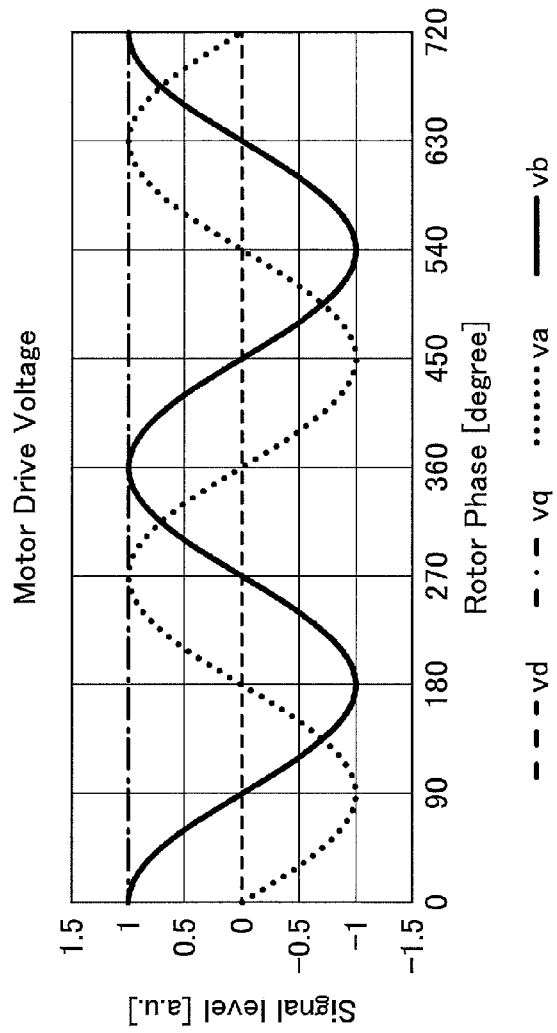
FIG. 19 is a first diagram depicting an operation concept of a vector rotation unit according to the third embodiment.

Next, with reference to FIG. 19 and FIG. 20, the operation of the vector rotation units 504, 505 will be described. FIG. 19 is a first diagram depicting an operation concept of the vector rotation unit according to the third embodiment.

FIG. 19 illustrates the operation concept of the vector rotation unit 504. In FIG. 19, an axis of ordinate represents an amplitude of electric voltage, and an axis of abscissa is a phase (electric angle) th of the rotor 4. In the embodiment, a phase that is actually used is not the phase of the rotor 4 itself, but position information th_est estimated by the position estimation unit 506. However, because the position estimation unit 506 performs estimation so as to satisfy the condition, the position information th_est=th, the actual phase and the estimated position information are considered to be essentially the same.

In FIG. 19, a wavy line represents the d-axis drive electric voltage equivalent value vd. In FIG. 19, when the drive electric voltage Vd is assumed to be a direct current with Vd=0 and the drive electric voltage Vq is assumed to be a direct current with Vq=1, as illustrated in FIG. 19, A-phase electric voltage equivalent value va=−sin (th), and B-phase electric voltage equivalent value vb=cos (th).

The above-described relation illustrates a phase relation in which the A-phase is advanced more than the B-phase by 90 degrees, and 0 degrees correspond to the reference phase (electric angle) of the rotor of 0 degrees. Moreover, when the drive electric voltage Vd is 0 (Vd=0), amplitudes of the electric voltage equivalent values va, vb are determined by a level of the q-axis drive electric voltage Vq.

Figure 20:
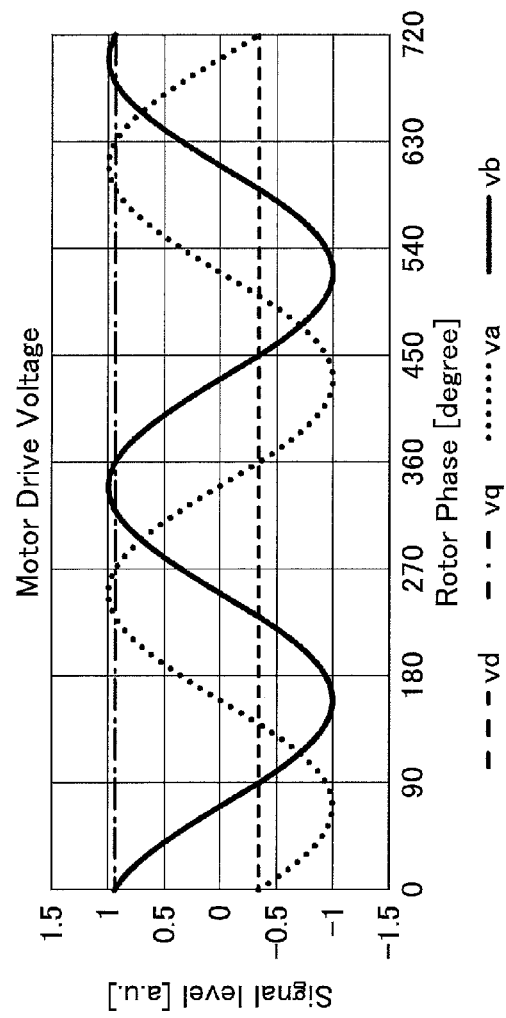
FIG. 20 is a second diagram depicting the operation concept of the vector rotation unit according to the third embodiment.

FIG. 20 is a second diagram depicting the operation concept of the vector rotation unit according to the third embodiment. In the example of FIG. 20, the drive electric voltage is set to Vd=0.342 and the drive electric voltage is set to Vq=0.940.

In the example of FIG. 20, the amplitude of the electric voltage equivalent values va, vb remain 1. The A-phase is found to be advanced more than the reference phase of the rotor 4 by 20 degrees.

In the embodiment, a relation between the drive electric voltage Vd and the drive electric voltage Vq is controlled based on a relation between the d-axis electric current equivalent value id and the q-axis electric current equivalent value iq in the d-axis electric current control unit 502 and the q-axis electric current control unit 503. Therefore, for example, when the rotational speed of the stepping motor 1 increases and phase delays of the coil electric current equivalent values ia, ib become greater, the drive electric voltages Vd and Vq are controlled so as to advance the phases of the A-phase electric voltage equivalent value va and the B-phase electric voltage equivalent value vb. Therefore, in the embodiment, decrease in efficiency by the rotational speed of the stepping motor 1 can be suppressed. The efficiency in the embodiment indicates a ratio of a mechanical output to an input electric power supplied to the stepping motor 1.

Figure 21:
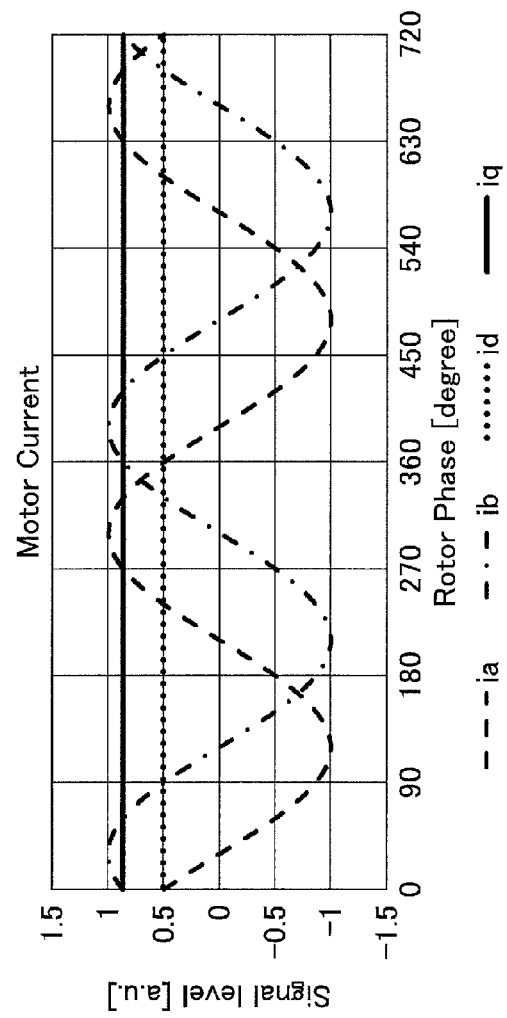
FIG. 21 is a third diagram depicting the operation concept of the vector rotation unit according to the third embodiment.

FIG. 21 is a third diagram depicting the operation concept of the vector rotation unit according to the third embodiment. FIG. 21 illustrates the operation concept of the vector rotation unit 505. The condition is the same as FIG. 20, i.e. the drive electric voltage is set to Vd=0.342 and the drive electric voltage is set to Vq=0.940.

FIG. 21 illustrates a case where the phases of the A-phase coil electric current equivalent value ia and the B-phase coil electric current equivalent value ib are delayed from the reference phase of the rotor 4 by 30 degrees (electric angle). At this time, the d-axis electric current equivalent value id and the q-axis electric current equivalent value iq become direct currents with id=0.5 and iq=0.866, respectively.

Moreover, when the A-phase coil electric current equivalent value ia and the B-phase coil electric current equivalent value ib are delayed from the reference phase of the rotor 4 by 0 degrees, the d-axis electric current equivalent value id and the q-axis electric current equivalent value iq become id=0 and iq=1, respectively.

That is, in the embodiment, if electric current is controlled so as to satisfy the condition of id=0 (target amplitude value of drive electric current idt=0), delay of phases of the A-phase coil electric current equivalent value ia and the B-phase coil electric current equivalent value ib with respect to the reference phase of the rotor 4 can be controlled to 0 degrees.

Furthermore, in the embodiment, by setting the value of the d-axis electric current equivalent value id (value of the target amplitude value of drive current idt) to a value other than 0, the phases of the coil electric current equivalent values ia, ib can be deviated from the reference phase of the rotor 4. Therefore, in the embodiment, by causing the phases of the coil electric current equivalent values ia, ib to deviate from the reference phase of the rotor 4, a reluctance torque can be used, and power efficiency can be enhanced. The reluctance torque is a torque occurring when a coil electric magnet and a conducting body of a rotor attract each other.

As described above, in the embodiment, phases of the coil electric current equivalent values ia, ib can be controlled so as to have a predetermined relation with the reference phase of the rotor 4 by the d-axis electric current control unit 502, the q-axis electric current control unit 503, the vector rotation unit 504 and the vector rotation unit 505.

Moreover, in the embodiment, by converting the coil electric current equivalent values ia, ib that are alternating currents into dq-axis electric current that are direct currents (low frequency) and controlling, an electric current control bandwidth can be suppressed to a lower region. For example, when the coil electric current equivalent values ia, ib that are alternating currents are controlled to be caused to follow a target signal, an electric current is required to be controlled in a bandwidth of sufficiently higher frequency than the frequency of the coil electric current equivalent values ia, ib that are alternating currents. In this case, cost becomes higher. In contrast, in the embodiment, as described above, the bandwidth for controlling electric current can be made lower, and cost can be reduced.

Fourth Embodiment

In the following, a fourth embodiment will be described with reference to drawings. The fourth embodiment describes an image forming apparatus and a conveyance apparatus installing the motor control apparatus 100 according to the first embodiment.

Figure 22:
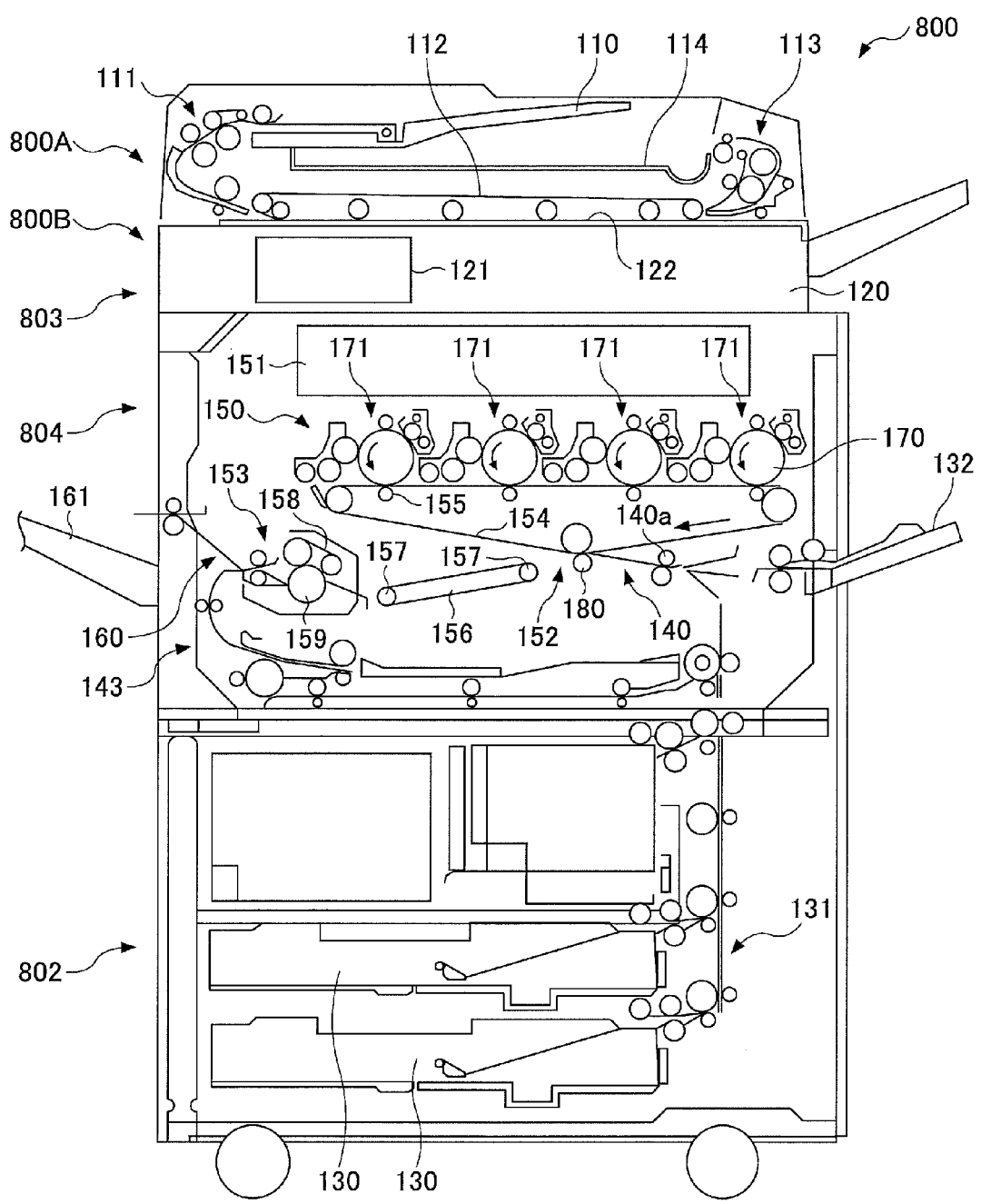
FIG. 22 is a diagram for explaining an image forming apparatus in which the motor control apparatus is installed.

FIG. 22 is a diagram for explaining an image forming apparatus in which the motor control apparatus is installed.

An image forming apparatus 800 according to the embodiment includes an ADF (Auto Document Feeder) 800A and an apparatus main body 800B. The apparatus main body 800B includes a paper feeding unit 802, an image readout unit 803, and an image formation unit 804.

The ADF 800A includes a document tray 110, a document feeding roller 111, a document conveyance belt 112, a document ejection roller 113, and a document ejection tray 114. The ADF 800A is openably and closably mounted on the image readout unit 803 via an opening mechanism such as a hinge.

The document feeding roller 111 separates documents one by one from a document bundle placed on the document tray 110, and conveys them toward the image readout unit 803. The document conveyance belt 112 conveys the documents separated by the document feeding roller 111 to the image readout unit 803. The document ejection roller 113 ejects documents ejected by the document conveyance belt 112 from the image readout unit 803 to the document ejection tray 114 below the document tray 110.

The image readout unit 803 includes a cabinet 120, a scan optical unit 121, a contact glass 122, and a driving means. The scan optical unit 121 includes an LED unit and is provided inside the cabinet 120. The scan optical unit 121 emits light from the LED unit in a main scanning direction, and is caused to scan by the driving means in a sub scanning direction in an entire irradiation region. Therefore, the scan optical unit 121 reads out a two-dimensional color image on a document.

The contact glass 122 is provided in an upper part of the cabinet 120 of the image readout unit 803, and forms a top side portion of the cabinet 120. The driving means is provided with a wire fixed to the scan optical unit 121, a plurality of driven pulleys and a driving pulley bridged by the wire, and a motor for rotating the driving pulley.

The paper feeding unit 802 includes a paper feeding cassette 130 and a paper feeding means 131. The paper feeding cassette 130 stores sheets of paper as recording media having different sheet sizes. The paper feeding means 131 conveys a sheet of paper stored in the paper feeding cassette 130 to a main conveyance path 140 of the image formation unit 804.

Moreover, on a side surface of the image formation unit 804, a manual paper feeding tray 132 is openably and closably arranged on the image formation unit 804. A paper bundle is manually fed on a top face of the tray in a state of opening the image formation unit 804. The uppermost sheet of the manually fed paper bundle is sent toward the main conveyance path 140 by a delivery roller of the manual paper feeding tray 132.

On the main conveyance path 140, a registration roller pair 140a is arranged. The registration roller pair 140a holds a sheet of paper conveyed in the main conveyance path 140 between rollers, and thereafter sends it toward a secondary transfer nip at a predetermined timing.

The image formation unit 804 includes an exposure unit 151, a tandem image formation unit 150, an intermediate transfer belt 154, an intermediate transfer roller 155, a secondary transfer device 152, a fixing unit 153, and the like. Moreover, the image formation unit 804 includes the main conveyance path 140, a reverse conveyance path 143, a paper ejection path 160, and the like.

As illustrated in FIG. 22, the exposure unit 151 is arranged adjacent to the tandem image formation unit 150. The exposure unit 151 is configured to perform exposure to photoconductor drums 170 arranged corresponding to respective colors of yellow, cyan, magenta and black.

The tandem image formation unit 150 is configured from four image formation units 171 of yellow, cyan, magenta and black arranged on the intermediate transfer belt 154 and along a rotation direction of the intermediate transfer belt 154. Each image formation unit 171, detailed illustration of which is omitted, includes a charging device, a developing device, a photoconductor cleaning device, a discharging device and the like provided corresponding to the above-described colors. Then, each photoconductor drum 170 and the respective above-described devices arranged around the photoconductor drum are unitized to form a process cartridge.

The tandem image formation unit 150 is configured to form visible images (toner images) formed by toners, colors of which are divided into the respective photoconductor drums 170, based on image information read out by the image readout unit 803 and dissolved into colors. Moreover, the visible images formed on the respective photoconductor drums 170 are transferred onto the intermediate transfer belt 154 between the respective photoconductor drums 170 and the intermediate transfer rollers 155.

In contrast, the secondary transfer device 152 is arranged on the opposite side of the tandem image formation unit 150 with the intermediate transfer belt 154 in between. The secondary transfer device 152 includes a secondary transfer roller 180 as a transfer member. By pressing the secondary transfer roller 180 to the intermediate transfer belt 154, a secondary transfer nip is formed. In the secondary transfer nip, the toner image formed on the intermediate transfer belt 154 is transferred onto a sheet of paper conveyed from the paper feeding unit 802 via the main conveyance path 140.

The sheet of paper on which a toner image is transferred in the secondary transfer nip is sent to the fixing unit 153 by a paper conveyance belt 156 which is stretched over two support rollers 157.

The fixing unit 153 is operated by pressing a pressurizing roller 159 to a fixing belt 158 that is an endless belt. Then, the fixing unit 153 is configured to melt toner of a toner image transferred on a sheet of paper by applying heat and pressure on the sheet of paper by the pressurizing roller 159 and fixing a color image on the sheet of paper.

In this way, the sheet of paper on which the color image is fixed is stacked on a paper ejection tray 161 outside the apparatus via the paper ejection path 160 as a paper ejection conveyance path.

Moreover, as illustrated in FIG. 22, the reverse conveyance path 143 is arranged on the lower side of the secondary transfer device 152 and the fixing unit 153. The reverse conveyance path 143 is used, in order to form images on both sides of a sheet of paper, for reversing front and back sides of a sheet of paper ejected from the fixing unit 153 and supplying it again into the secondary transfer device 152 via the main conveyance path 140.

In the image forming apparatus 800 configured as described above, the ADF 800A functions as a conveyance apparatus 800A for conveying document that is an example of a sheet. Moreover, the paper feeding means 131 of the paper feeding unit 802, the main conveyance path 140 of the image formation unit 804, the reverse conveyance path 143, the paper ejection path 150 and the like in an apparatus main body 101B functions, respectively, as paper conveyance devices for conveying a sheet of paper that is an example of a sheet. The sheet conveyance devices convey a sheet by rotating a roller member by power of a motor. The image forming apparatus 800 according to the embodiment is provided with the motor control apparatus 100 according to the embodiment, in order to control the motor of these sheet conveyance apparatuses.

Figure 23:
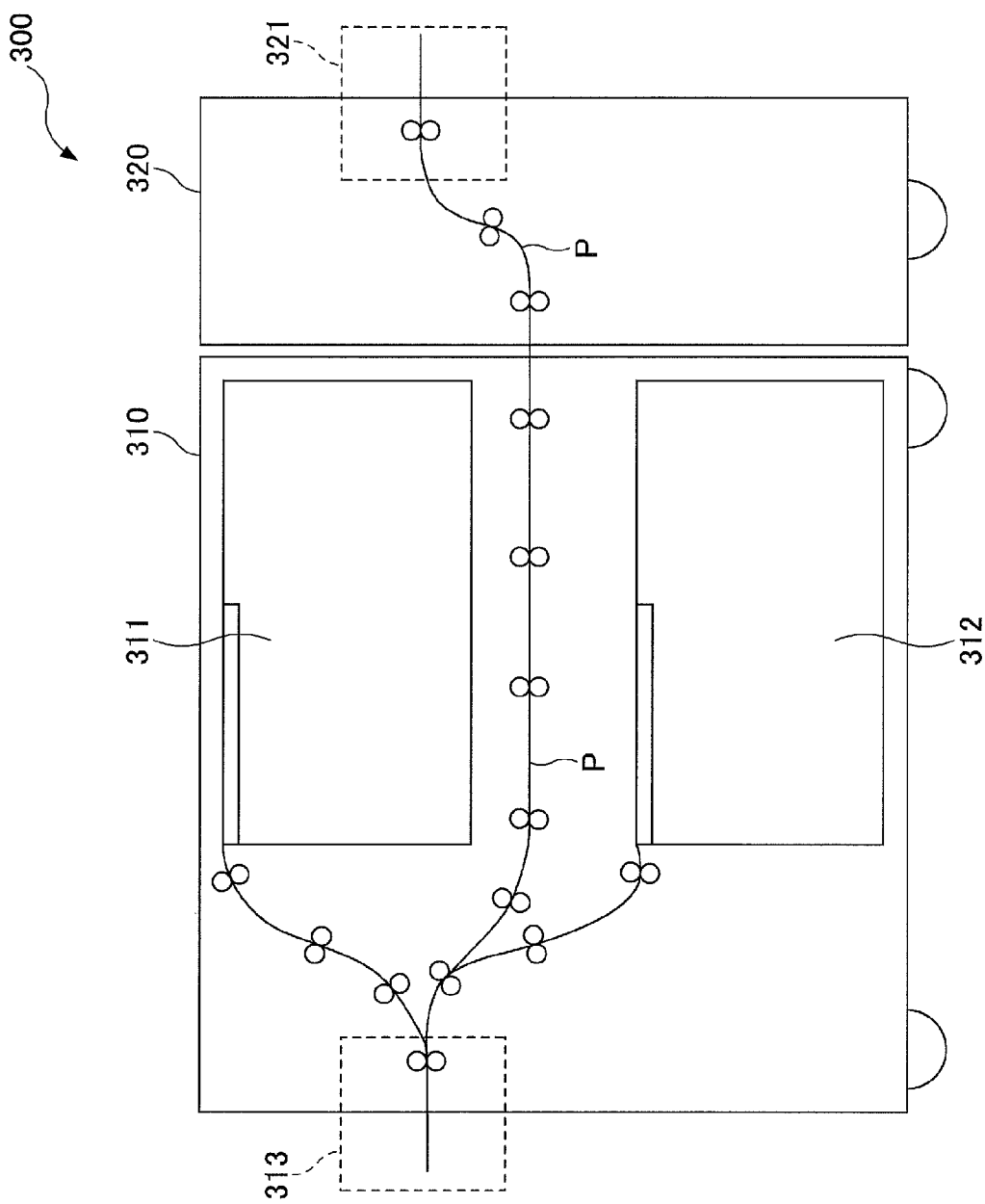
FIG. 23 is a schematic configuration diagram of a conveyance apparatus coupled to the image forming apparatus.

FIG. 23 is a schematic configuration diagram of the conveyance apparatus coupled to the image forming apparatus. As illustrated in FIG. 23, a conveyance apparatus 700 includes a paper feeding main body unit 710 and a relay unit 720, and has a configuration where the plurality of paper feeding main body units 710 can be coupled in series via the relay unit 720. The paper feeding main body unit 710 conveys a sheet of paper, which is selectively taken from paper feeding trays 711, 712, or a sheet of paper from paper feeding main body unit 710 on an upstream side, which is serially coupled via the relay unit 720, along a conveyance path P, and supplies to the image forming apparatus 800 coupled via a connection unit 713. The relay unit 720 is coupled to the paper feeding main body unit 710 on the upstream side via a connection unit 721, and conveys a sheet of paper supplied from the paper feeding main body unit 710 on the upstream side to the paper feeding main body unit 710 on the downstream side.

The conveyance apparatus 700 configured as described above, by rotating roller members arranged along the conveyance path P by power of a motor, conveys a sheet of paper that is an example of a sheet. The motor control apparatus 100 according to the first embodiment may be installed, for example, in the conveyance apparatus 700.

Moreover, the motor control apparatus 100 according to the first embodiment can be effectively applied to, not limited to the image forming apparatus 800 or the conveyance apparatus 700, but various sheet conveyance apparatuses having a configuration of conveying a sheet by rotating roller members by power of a motor.

In addition, a first armature coil recited in claims corresponds to the A-phase coil 2, a second armature coil corresponds to the B-phase coil 3, a motor corresponds to the stepping motor 1, and a rotator corresponds to the rotor 4. Moreover, a first PWM pulse signal recited in claims corresponds to the PWM pulse signals Ap, Am, and a second PWM pulse signal corresponds to the PWM pulse signals Bp, Bm. Moreover, a drive unit recited in claims corresponds to the motor driving device 200, a shift unit corresponds to the PWM shift units 230, 240. Moreover, first and second H-bridge units correspond to the H-bridge units 250, 260, and first and second electric current detector correspond to the electric current detector 101, 102.

As described above, the present invention is explained based on the respective embodiments. However, the present invention is not limited to these embodiments, but various variations and modifications may be made without departing from the scope of the present invention.

What is claimed is:

1. A motor driving apparatus for causing drive current to flow in first and second armature coils of two-phases, wound so as not to be coupled to each other, to rotate a rotator, comprising:
   a drive unit configured to give a first PWM pulse signal to each of both ends of the first armature coil, and give a second PWM pulse signal to each of both ends of the second armature coil, to cause the drive current to flow in the first and second armature coils,
   wherein the drive unit includes
   a first shift unit configured to, when a difference between pulse widths of the first PWM pulse signal given to one end of the first armature coil and of the first PWM pulse signal given to the other end is less than or equal to a first predetermined value, shift forward any one of pulses of the first PWM pulse signals given to the one end and the other end of the first armature coil, and
   a second shift unit configured to, in a case where the shift by the first shift unit is performed, when a difference between pulse widths of the second PWM pulse signal given to one end of the second armature coil and of the second PWM pulse signal given to the other end is less than or equal to a second predetermined value, shift backward any one of pulses of the second PWM pulse signals given to the one end and the other end of the second armature coil, along with the first shift unit.

2. A motor control apparatus comprising:
   the motor driving apparatus according to claim 1; and
   first and second H-bridge units coupled to the first and second armature coils, respectively, wherein
   the first and second H-bridge units include first and second electric current detectors configured to detect shunt electric current flowing in a ground side or power source side common bus, respectively.

3. The motor control apparatus according to claim 2,
   wherein the first and second electric current detectors configured to
   sample the shunt electric current at a first timing in a section where logics of the first PWM pulse signals are different from each other, to detect a coil electric current of the first armature coil, and
   sample the shunt electric current at a second timing in a section where logics of the first PWM pulse signals are different from each other, to detect a coil electric current of the second armature coil.

4. The motor control apparatus according to claim 3,
   wherein the first timing is a time of a changing point at which a duty of the first PWM pulse signal is 50% or a timing prior to the time of the changing point by a first predetermined time period, and
   the second timing is a timing at which a second predetermined time period has elapsed from a time of a changing point at which a duty of the second PWM pulse signal is 50%.

5. The motor control apparatus according to claim 2, further comprising:
   an electric current control unit configured to control the pulse widths of the first and second PWM pulse signals so as to adjust a signal according to the coil electric currents detected by the first and second electric current detectors to a target value.

6. A conveyance apparatus comprising:
   first and second armature coils of two-phases, wound so as not to be coupled to each other; and
   a motor drive apparatus for causing drive current to flow in the first and second armature coils, to rotate a rotator,
   wherein the motor drive apparatus includes
   a drive unit configured to give a first PWM pulse signal to each of both ends of the first armature coil, and give a second PWM pulse signal to each of both ends of the second armature coil, to cause the drive current to flow in the first and second armature coils,
   wherein the drive unit includes
   a first shift unit configured to, when a difference between pulse widths of the first PWM pulse signal given to one end of the first armature coil and of the first PWM pulse signal given to the other end is less than or equal to a first predetermined value, shift forward any one of pulses of the first PWM pulse signals given to the one end and the other end of the first armature coil, and
   a second shift unit configured to, in a case where the shift by the first shift unit is performed, when a difference between pulse widths of the second PWM pulse signal given to one end of the second armature coil and of the second PWM pulse signal given to the other end is less than or equal to a second predetermined value, shift backward any one of pulses of the second PWM pulse signals given to the one end and the other end of the second armature coil, along with the first shift unit.

7. A motor driving method by a motor driving apparatus for causing drive current to flow in first and second armature coils of two-phases, wound so as not to be coupled to each other, to rotate a rotator, comprising:
   giving a first PWM pulse signal to each of both ends of the first armature coil, and a second PWM pulse signal to each of both ends of the second armature coil, to cause the drive current to flow in the first and second armature coils;
   shifting, when a difference between pulse widths of the first PWM pulse signal given to one end of the first armature coil and of the first PWM pulse signal given to the other end is less than or equal to a first predetermined value, forward any one of pulses of the first PWM pulse signals given to the one end and the other end of the first armature coil, and
   shifting, in a case where any one of pulses of the first PWM pulse signals is shifted, when a difference between pulse widths of the second PWM pulse signal given to one end of the second armature coil and of the second PWM pulse signal given to the other end is less than or equal to a second predetermined value, backward any one of pulses of the second PWM pulse signals given to the one end and the other end of the second armature coil, along with shifting any one of pulses of the first PWM pulse signals.

* * * * *